(12) United States Patent
Weinhold et al.

(10) Patent No.: US 8,022,168 B2
(45) Date of Patent: *Sep. 20, 2011

(54) SPHEROIDAL POLYESTER POLYMER PARTICLES

(75) Inventors: Stephen Weinhold, Kingsport, TN (US); Frederick Leslie Colhoun, Kingsport, TN (US); Michael Paul Ekart, Kingsport, TN (US); Benjamin Bradford Gamble, Kingsport, TN (US)

(73) Assignee: Grupo Petrotexmex, S.A. de C.V., San Pedro Garza Garcia (MX)

( * ) Notice: Subject to any disclaimer, the term of this patent is extended or adjusted under 35 U.S.C. 154(b) by 0 days.

This patent is subject to a terminal disclaimer.

(21) Appl. No.: 11/454,271

(22) Filed: Jun. 16, 2006

(65) Prior Publication Data

US 2006/0235188 A1    Oct. 19, 2006

Related U.S. Application Data

(62) Division of application No. 11/018,357, filed on Dec. 21, 2004, now abandoned.

(60) Provisional application No. 60/606,727, filed on Sep. 2, 2004, provisional application No. 60/618,951, filed on Oct. 15, 2004.

(51) Int. Cl.
*B29B 9/06* (2006.01)
*B29B 9/16* (2006.01)

(52) U.S. Cl. ...... 528/272; 528/302; 528/308; 528/308.6; 528/481; 528/503; 428/35.2; 428/35.8

(58) Field of Classification Search ............... 525/272, 525/302, 308, 308.6, 481, 503; 428/35.2, 428/35.8; 528/272, 302, 308, 308.6, 481, 528/503
See application file for complete search history.

(56) References Cited

U.S. PATENT DOCUMENTS

| | | |
|---|---|---|
| 2,706,722 A | 4/1955 | Caldwell |
| 3,014,011 A | 12/1961 | Zoetbrood |
| 3,390,134 A | 6/1968 | Kibler |
| 3,451,971 A | 6/1969 | Lazarus |
| 3,624,040 A | 11/1971 | Rath et al. |
| 3,631,153 A | 12/1971 | Carter et al. |
| 3,673,139 A | 6/1972 | Hrach |
| 3,749,539 A | 7/1973 | Galbreath et al. |
| 3,753,637 A | 8/1973 | Gasior et al. |
| 3,880,582 A | 4/1975 | Sawaya |
| 3,953,404 A | 4/1976 | Borman |
| 3,960,807 A | 6/1976 | McTaggart |
| 3,972,852 A | 8/1976 | Inata et al. |
| 4,064,112 A | 12/1977 | Rothe et al. |
| 4,093,503 A | 6/1978 | Harris et al. |
| 4,100,142 A | 7/1978 | Schaefer et al. |
| 4,123,207 A | 10/1978 | Dudley |
| 4,251,198 A | 2/1981 | Altenburg |
| 4,254,207 A | 3/1981 | Landoll et al. |
| 4,260,735 A | 4/1981 | Bander et al. |
| 4,267,310 A | 5/1981 | Landoll |
| 4,289,871 A | 9/1981 | Rowan et al. |
| 4,289,874 A | 9/1981 | Bockrath |
| 4,300,877 A | 11/1981 | Andersen |
| 4,330,661 A | 5/1982 | Go |
| 4,357,461 A | 11/1982 | Go et al. |
| 4,401,804 A | 8/1983 | Wooten et al. |
| 4,421,470 A | 12/1983 | Nakamura |
| 4,424,337 A | 1/1984 | Smith et al. |
| 4,447,595 A | 5/1984 | Smith et al. |
| 4,470,791 A | 9/1984 | Tanaka et al. |
| 4,500,271 A | 2/1985 | Smith |
| 4,501,878 A | 2/1985 | Adams |
| 4,554,303 A | 11/1985 | Petke et al. |
| 4,591,629 A | 5/1986 | El-Ghatta et al. |
| 4,609,721 A | 9/1986 | Kirshenbaum et al. |
| 4,613,664 A | 9/1986 | Tate et al. |
| 4,617,374 A | 10/1986 | Pruett et al. |
| 4,619,987 A | 10/1986 | Saiki et al. |

(Continued)

FOREIGN PATENT DOCUMENTS
AT    259232    1/1968
(Continued)

OTHER PUBLICATIONS

Crank J., The Mathematics of Diffusion, 2d ed. p. 90-91 (Clarendon Press, Oxford 1975).

(Continued)

*Primary Examiner* — Nathan M Nutter
(74) *Attorney, Agent, or Firm* — Oblon, Spivak, McClelland, Maier & Neustadt, L.L.P.

(57) ABSTRACT

Spheroidal polyester polymer particles, as well as preforms and stretch blow molded bottles made from the spheroidal particles, are provided which have:
  A) an It.V. of at least 0.72 dL/g, and either
  B) at least two melting peaks (on a DSC first heating scan), wherein one of said at least two melting peaks is a low peak melting point having a peak temperature within a range of 140° C. to 220° C. and having a melting endotherm area of at least the absolute value of 1 J/g, or
  C) a low degree of crystallinity within a range of at least 20% and a maximum degree of crystallinity $T_{cmax}$ defined by the equation:

$$T_{cmax}=50\%-CA-OH$$

Figure 1:
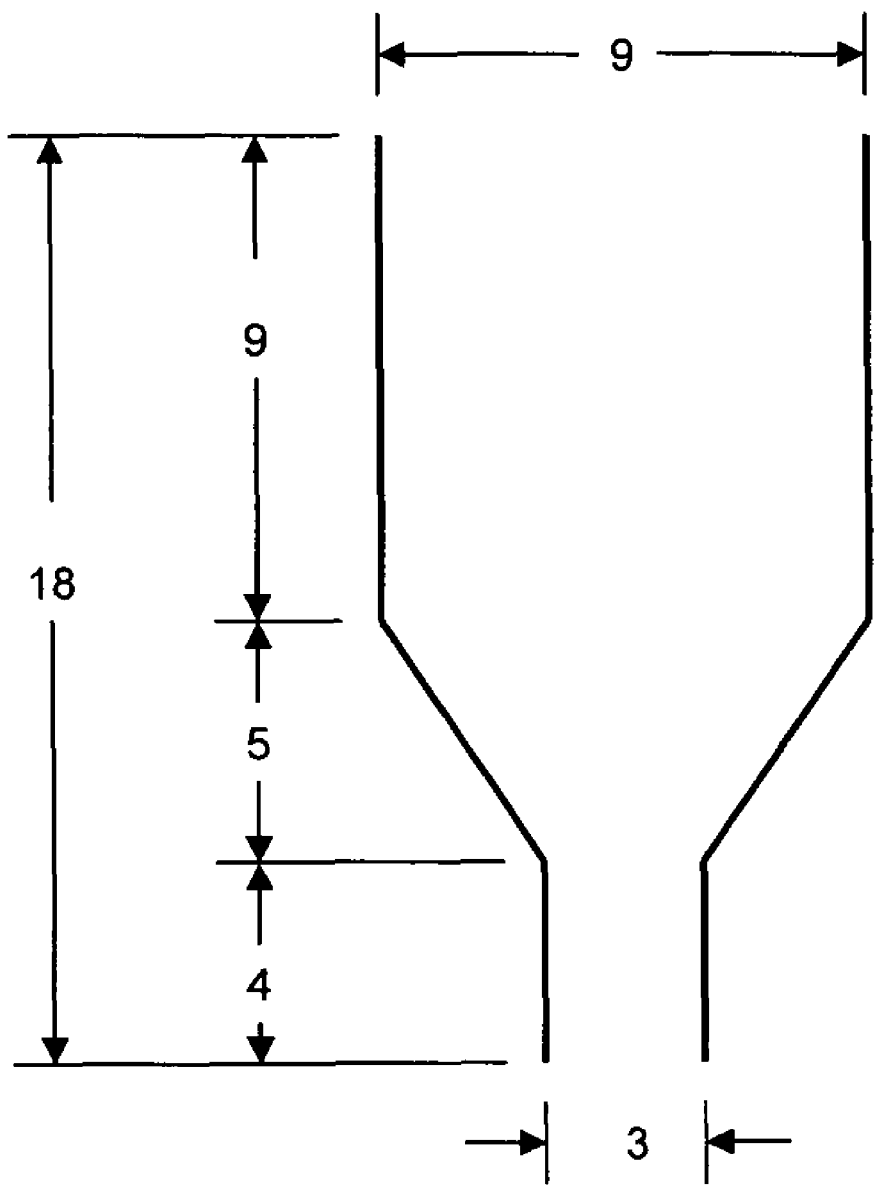

where CA is the total mole % of all carboxylic acid residues other than terephthalic acid residues, based on 100 mole % of carboxylic acid residues in the polyester polymer, and OH is the total mole % of hydroxyl functional compound residues other than ethylene glycol residues, based on 100 mole % of the hydroxyl functional compounds residues; or both B) and C); and optionally but preferably
  D) 10 ppm or less of residual acetaldehyde.

26 Claims, 5 Drawing Sheets

U.S. PATENT DOCUMENTS

| | | | |
|---|---|---|---|
| 4,647,650 A | 3/1987 | Sasaki et al. | |
| 4,728,275 A | 3/1988 | DiLullo et al. | |
| 4,728,276 A | 3/1988 | Pauley et al. | |
| 4,764,323 A | 8/1988 | Al Ghatta | |
| 4,822,546 A | 4/1989 | Lohkamp | |
| 5,049,647 A | 9/1991 | Al-Ghatta | |
| 5,059,103 A | 10/1991 | Bruckmann | |
| 5,100,605 A | 3/1992 | Bartlet et al. | |
| 5,104,965 A | 4/1992 | Jenkins et al. | |
| 5,164,478 A | 11/1992 | Lee et al. | |
| 5,187,216 A | 2/1993 | Cassell et al. | |
| 5,235,027 A | 8/1993 | Thiele et al. | |
| 5,250,333 A | 10/1993 | McNeely et al. | |
| 5,258,233 A | 11/1993 | Mills et al. | |
| 5,266,413 A | 11/1993 | Mills et al. | |
| 5,290,913 A | 3/1994 | McAllister et al. | |
| 5,310,515 A | 5/1994 | Jürgen et al. | |
| 5,334,669 A | 8/1994 | Ghisolfi | |
| 5,340,884 A | 8/1994 | Mills et al. | |
| 5,340,906 A | 8/1994 | Shirokura et al. | |
| 5,372,864 A | 12/1994 | Weaver et al. | |
| 5,384,337 A | 1/1995 | Budinger | |
| 5,384,377 A | 1/1995 | Weaver et al. | |
| 5,393,871 A | 2/1995 | Yau et al. | |
| 5,409,750 A | 4/1995 | Hamada et al. | |
| 5,442,036 A | 8/1995 | Beavers et al. | |
| 5,444,144 A | 8/1995 | Tanaka et al. | |
| 5,474,111 A | 12/1995 | Williamson et al. | |
| 5,532,333 A | 7/1996 | Stouffer et al. | |
| 5,532,335 A | 7/1996 | Kimball et al. | |
| 5,540,868 A | 7/1996 | Stouffer et al. | |
| 5,567,796 A | 10/1996 | Nakatsukasa et al. | |
| 5,573,820 A | 11/1996 | Harazoe et al. | |
| 5,597,586 A | 1/1997 | Wilson et al. | |
| 5,599,562 A | 2/1997 | Harris et al. | |
| 5,608,027 A | 3/1997 | Crosby et al. | |
| 5,611,983 A | 3/1997 | Ma et al. | |
| 5,628,947 A | 5/1997 | Keilert | |
| 5,646,208 A | 7/1997 | Cattron et al. | |
| 5,648,032 A | 7/1997 | Nelson et al. | |
| 5,656,221 A | 8/1997 | Schumann et al. | |
| 5,656,719 A | 8/1997 | Stibal et al. | |
| 5,663,290 A | 9/1997 | Heise et al. | |
| 5,714,262 A | 2/1998 | Stouffer et al. | |
| 5,744,074 A | 4/1998 | Stouffer et al. | |
| 5,744,578 A | 4/1998 | Duh | |
| 5,766,533 A | 6/1998 | Mears et al. | |
| 5,780,575 A | 7/1998 | Brink et al. | |
| 5,869,517 A | 2/1999 | Muller | |
| 5,886,133 A | 3/1999 | Hilbert et al. | |
| 5,895,617 A | 4/1999 | Mizuguchi et al. | |
| 5,898,058 A | 4/1999 | Nichols et al. | |
| 5,902,539 A | 5/1999 | Schmidt et al. | |
| 5,919,872 A | 7/1999 | Tung et al. | |
| 5,942,170 A | 8/1999 | Peitz | |
| 5,945,460 A | 8/1999 | Ekart et al. | |
| 5,962,625 A | 10/1999 | Yau | |
| 5,980,797 A | 11/1999 | Shelby et al. | |
| 6,020,421 A | 2/2000 | Fukushima et al. | |
| 6,048,957 A | 4/2000 | Ekart et al. | |
| 6,066,713 A | 5/2000 | Mrose et al. | |
| 6,066,714 A | 5/2000 | Putzig et al. | |
| 6,068,910 A | 5/2000 | Flynn et al. | |
| 6,090,898 A | 7/2000 | Tsunekawa et al. | |
| 6,099,778 A | 8/2000 | Nelson et al. | |
| 6,113,997 A | 9/2000 | Massey et al. | |
| 6,129,961 A | 10/2000 | Sonoda et al. | |
| 6,160,085 A | 12/2000 | Fujimori et al. | |
| 6,194,536 B1 | 2/2001 | Schmidt et al. | |
| 6,200,659 B1 | 3/2001 | Fujimori et al. | |
| 6,228,302 B1 | 5/2001 | Al Ghatta | |
| 6,235,228 B1 | 5/2001 | Nicholl et al. | |
| 6,239,233 B1 | 5/2001 | Bell et al. | |
| 6,274,212 B1 | 8/2001 | Rule et al. | |
| 6,274,656 B1 | 8/2001 | Ma et al. | |
| 6,297,315 B1 | 10/2001 | Duh et al. | |
| 6,313,200 B1 | 11/2001 | Finder | |
| 6,316,584 B1 | 11/2001 | Seidel et al. | |
| 6,320,014 B1 | 11/2001 | Takahashi et al. | |
| 6,332,765 B1 | 12/2001 | Spelleken | |
| 6,335,422 B2 | 1/2002 | Schiavone | |
| 6,339,109 B1 | 1/2002 | Day et al. | |
| 6,344,539 B1 | 2/2002 | Palmer | |
| 6,384,180 B1 | 5/2002 | Jernigan et al. | |
| 6,395,865 B2 | 5/2002 | Schmidt et al. | |
| 6,444,283 B1 | 9/2002 | Turner et al. | |
| 6,461,575 B1 | 10/2002 | Duh et al. | |
| 6,472,500 B2 | 10/2002 | Dhawan et al. | |
| 6,474,969 B1 | 11/2002 | Ready et al. | |
| 6,500,915 B1 | 12/2002 | Fujimori et al. | |
| 6,512,078 B1 | 1/2003 | Gantillon et al. | |
| 6,517,762 B1 | 2/2003 | Tsunekawa et al. | |
| 6,551,087 B1 | 4/2003 | Martin | |
| 6,551,699 B1 | 4/2003 | Flynn | |
| 6,559,271 B2 | 5/2003 | Schaaf et al. | |
| 6,569,991 B2 | 5/2003 | Nichols et al. | |
| 6,573,359 B2 | 6/2003 | Nichols et al. | |
| 6,586,558 B2 | 7/2003 | Schmidt et al. | |
| 6,590,069 B2 | 7/2003 | Nichols et al. | |
| 6,592,350 B1 | 7/2003 | Chszanieckl | |
| 6,599,596 B2 | 7/2003 | Nichols et al. | |
| 6,601,987 B2 | 8/2003 | Finder et al. | |
| 6,613,259 B2 | 9/2003 | Takahashi et al. | |
| 6,616,968 B2 | 9/2003 | Bostrom et al. | |
| 6,669,986 B1 | 12/2003 | Mushiake et al. | |
| 6,703,474 B2 | 3/2004 | Fujimori et al. | |
| 6,710,158 B2 | 3/2004 | Edwards et al. | |
| 6,762,275 B1 | 7/2004 | Rule et al. | |
| 6,787,630 B1 | 9/2004 | Dominguez De Walter et al. | |
| 6,833,096 B2 | 12/2004 | Wang | |
| 6,903,154 B2 | 6/2005 | Stafford et al. | |
| 7,033,152 B2 | 4/2006 | Eloo et al. | |
| 7,039,019 B2 | 5/2006 | Niiya et al. | |
| 7,084,235 B2 | 8/2006 | Otto et al. | |
| 7,192,545 B2 | 3/2007 | Ekart et al. | |
| 7,193,032 B2 | 3/2007 | Culbert et al. | |
| 7,262,263 B2 | 8/2007 | Otto et al. | |
| 7,329,723 B2 | 2/2008 | Jernigan | |
| 7,358,322 B2 | 4/2008 | Jernigan | |
| 7,368,522 B2 | 5/2008 | Jernigan | |
| 7,459,113 B2 * | 12/2008 | Colhoun et al. ........... 264/176.1 | |
| 2001/0034431 A1 | 10/2001 | Schiavone | |
| 2002/0077443 A1 | 6/2002 | Nichols et al. | |
| 2002/0091226 A1 | 7/2002 | Nichols et al. | |
| 2002/0128427 A1 | 9/2002 | Schaaf et al. | |
| 2002/0171159 A1 | 11/2002 | Matthaei et al. | |
| 2003/0109640 A1 | 6/2003 | Lee et al. | |
| 2003/0144459 A1 | 7/2003 | Fujimori et al. | |
| 2004/0009254 A1 | 1/2004 | Eloo et al. | |
| 2004/0011330 A1 | 1/2004 | Sauler et al. | |
| 2004/0096609 A1 | 5/2004 | Nichols et al. | |
| 2004/0127653 A1 | 7/2004 | Ellington et al. | |
| 2004/0236065 A1 | 11/2004 | Denis et al. | |
| 2005/0065318 A1 * | 3/2005 | Jernigan et al. ............... 528/480 |
| 2005/0085620 A1 | 4/2005 | Bruckmann | |
| 2005/0154183 A1 * | 7/2005 | Ekart et al. ................... 528/486 |
| 2005/0196566 A1 | 9/2005 | Colhoun et al. | |
| 2005/0215753 A1 | 9/2005 | Otto et al. | |
| 2006/0046004 A1 * | 3/2006 | Ekart et al. .................... 428/34.1 |
| 2006/0047102 A1 | 3/2006 | Weinhold et al. | |
| 2006/0047103 A1 | 3/2006 | Armentrout | |
| 2006/0147666 A1 | 7/2006 | Christel et al. | |
| 2006/0149026 A1 * | 7/2006 | Jernigan et al. ............... 528/274 |
| 2007/0135614 A1 * | 6/2007 | Ekart et al. ................... 528/272 |
| 2008/0071061 A1 | 3/2008 | Bruckmann | |
| 2008/0154021 A1 * | 6/2008 | Jernigan et al. ............... 528/480 |

FOREIGN PATENT DOCUMENTS

| | | |
|---|---|---|
| CA | 2372528 | 11/2000 |
| CA | 2340358 | 1/2001 |
| CA | 2468414 | 6/2003 |
| CS | 200745 B | 6/1978 |
| DE | 1950553 | 4/1970 |
| DE | 2347013 A | 3/1975 |
| DE | 226896 | 9/1985 |
| DE | 3503330 A | 8/1986 |
| DE | 19537930 A1 | 4/1997 |

| | | | | | | |
|---|---|---|---|---|---|---|
| DE | 19848245 | 4/2000 | | JP | 60026026 A | 2/1985 |
| DE | 10149474 | 4/2003 | | JP | 60202148 | 10/1985 |
| DE | 10215344 | 10/2003 | | JP | 60-219226 | 11/1985 |
| DE | 10333648 A1 | 9/2004 | | JP | 60219226 | 11/1985 |
| DE | 102004015515 A1 | 9/2004 | | JP | 62152715 | 7/1987 |
| EP | 0492999 | 9/1992 | | JP | 62161827 | 7/1987 |
| EP | 1065230 A2 | 8/1994 | | JP | 62207337 | 9/1987 |
| EP | 0661326 A2 | 7/1995 | | JP | 62-297318 | 12/1987 |
| EP | 0699700 | 3/1996 | | JP | 62297318 | 12/1987 |
| EP | 0727303 A2 | 8/1996 | | JP | 73035948 | 11/1988 |
| EP | 077447 | 5/1997 | | JP | 62182065 | 1/1989 |
| EP | 867458 A2 | 9/1998 | | JP | 1180309 A | 7/1989 |
| EP | 0921144 B1 | 9/1999 | | JP | 3-146707 | 6/1991 |
| EP | 0974438 B1 | 1/2000 | | JP | 3146707 | 6/1991 |
| EP | 0988342 B1 | 3/2000 | | JP | 3-161509 | 7/1991 |
| EP | 0821640 B1 | 6/2000 | | JP | 3161509 | 7/1991 |
| EP | 1181140 B1 | 2/2002 | | JP | 3292323 | 12/1991 |
| EP | 1188783 A2 | 3/2002 | | JP | 4370142 | 12/1992 |
| EP | 0804499 B1 | 7/2002 | | JP | 5070567 | 3/1993 |
| EP | 0937117 B1 | 1/2003 | | JP | 1993070567 | 3/1993 |
| GB | 1250690 | 10/1971 | | JP | 5097990 | 4/1993 |
| GB | 1337751 | 11/1973 | | JP | 6087953 | 3/1994 |
| JP | 46-41025 | 12/1971 | | JP | 6286088 | 10/1994 |
| JP | 46041025 | 12/1971 | | JP | 7001447 | 1/1995 |
| JP | 46041033 | 12/1971 | | JP | 7133412 | 5/1995 |
| JP | 47039497 | 11/1972 | | JP | 7224218 | 8/1995 |
| JP | 47042989 | 12/1972 | | JP | 1996003301 | 1/1996 |
| JP | 48005798 | 1/1973 | | JP | 8073611 | 3/1996 |
| JP | 48005798 | 2/1973 | | JP | 1996073581 | 3/1996 |
| JP | 48007272 | 3/1973 | | JP | 1996283398 | 10/1996 |
| JP | 48026955 | 4/1973 | | JP | 8-325364 | 12/1996 |
| JP | 48056782 | 8/1973 | | JP | 8325364 | 12/1996 |
| JP | 48056783 | 8/1973 | | JP | 1997040850 | 2/1997 |
| JP | 48056784 | 8/1973 | | JP | 9176464 | 7/1997 |
| JP | 48031991 | 10/1973 | | JP | 9176465 | 7/1997 |
| JP | 48079898 | 10/1973 | | JP | 9183892 | 7/1997 |
| JP | 48038634 | 11/1973 | | JP | 9272793 | 10/1997 |
| JP | 48038635 | 11/1973 | | JP | 10316765 | 12/1998 |
| JP | 48038637 | 11/1973 | | JP | 11005892 | 1/1999 |
| JP | 49005918 | 1/1974 | | JP | 3095166 B2 | 6/1999 |
| JP | 49010834 | 1/1974 | | JP | 1999152324 | 6/1999 |
| JP | 49006835 | 2/1974 | | JP | 2000026580 | 1/2000 |
| JP | 49006839 | 2/1974 | | JP | 2000044666 | 2/2000 |
| JP | 49009116 | 3/1974 | | JP | 3041851 | 5/2000 |
| JP | 48045015 | 4/1974 | | JP | 2000128970 | 5/2000 |
| JP | 49045014 | 4/1974 | | JP | 2000128971 | 5/2000 |
| JP | 49045015 | 4/1974 | | JP | 2000129102 | 5/2000 |
| JP | 50039711 | 4/1975 | | JP | 2000204145 | 7/2000 |
| JP | 51042795 | 4/1976 | | JP | 3075406 | 8/2000 |
| JP | 51127195 | 11/1976 | | JP | 2001040081 | 2/2001 |
| JP | 51145594 | 12/1976 | | JP | 2001072753 | 3/2001 |
| JP | 53105591 | 9/1977 | | JP | 2001072754 A | 3/2001 |
| JP | 52123489 | 10/1977 | | JP | 2001079836 | 3/2001 |
| JP | 52129798 | 10/1977 | | JP | 2001081171 A | 3/2001 |
| JP | 52129799 | 10/1977 | | JP | 2001081174 A | 3/2001 |
| JP | 53021294 | 5/1978 | | JP | 2001106777 | 4/2001 |
| JP | 53051294 | 5/1978 | | JP | 2001131277 | 5/2001 |
| JP | 53051295 | 5/1978 | | JP | 2001247669 A | 9/2001 |
| JP | 53052595 | 5/1978 | | JP | 2001302777 | 10/2001 |
| JP | 53054295 | 5/1978 | | JP | 2001302778 | 10/2001 |
| JP | 54135896 | 10/1979 | | JP | 2003181831 | 12/2001 |
| JP | 54163996 | 12/1979 | | JP | 2002105189 | 4/2002 |
| JP | 54163996 A | 12/1979 | | JP | 2002249648 | 9/2002 |
| JP | 55089332 | 7/1980 | | JP | 2002249653 | 9/2002 |
| JP | 55089332 A | 7/1980 | | JP | 2002322258 | 11/2002 |
| JP | 55149320 | 11/1980 | | JP | 2002332340 | 11/2002 |
| JP | 55149320 A | 11/1980 | | JP | 2002338676 | 11/2002 |
| JP | 56008431 | 1/1981 | | JP | 2003137993 | 5/2003 |
| JP | 56008431 A | 1/1981 | | JP | 2003200420 | 7/2003 |
| JP | 56055426 A | 5/1981 | | JP | 2003206344 | 7/2003 |
| JP | 56118420 A | 9/1981 | | JP | 2003206346 | 7/2003 |
| JP | 56147823 A | 11/1981 | | JP | 2003301090 | 10/2003 |
| JP | 57038609 | 8/1982 | | JP | 2003301093 | 10/2003 |
| JP | 58109532 | 6/1983 | | JP | 2003306536 | 10/2003 |
| JP | 58109532 A | 6/1983 | | JP | 2003306537 | 10/2003 |
| JP | 5925815 A | 2/1984 | | JP | 2003306538 | 10/2003 |
| JP | 59045106 A | 3/1984 | | JP | 2003306540 | 10/2003 |
| JP | 59051295 | 3/1984 | | JP | 2003306541 | 10/2003 |
| JP | 59219328 A | 12/1984 | | JP | 2003306601 | 10/2003 |

| | | |
|---|---|---|
| JP | 2003327680 | 11/2003 |
| JP | 2003342358 | 12/2003 |
| JP | 2004149790 | 5/2004 |
| JP | 2003301091 | 10/2008 |
| KR | 9303713 | 5/1993 |
| KR | 1997-0007952 | 5/1997 |
| KR | 19970007952 | 5/1997 |
| KR | 2001-0089942 | 10/2001 |
| KR | 20010089942 | 10/2001 |
| NL | 7113206 | 3/1972 |
| RU | 2182157 | 5/2002 |
| WO | WO 92/02569 | 2/1992 |
| WO | WO 92/18554 | 10/1992 |
| WO | WO 98/12244 | 3/1994 |
| WO | WO 96/01256 | 1/1996 |
| WO | WO 96/22320 | 7/1996 |
| WO | WO 96/33853 | 10/1996 |
| WO | WO 97/05186 | 2/1997 |
| WO | WO 97/05187 | 2/1997 |
| WO | WO 97/28218 | 8/1997 |
| WO | WO 97/31968 | 9/1997 |
| WO | WO 97/42250 | 11/1997 |
| WO | WO 97/44376 | 11/1997 |
| WO | WO 98/18847 | 5/1998 |
| WO | WO 98/41559 | 9/1998 |
| WO | WO 99/47605 | 9/1999 |
| WO | WO 00/23497 | 4/2000 |
| WO | WO 00/32673 | 6/2000 |
| WO | WO 00/32677 | 6/2000 |
| WO | WO 00/46004 | 8/2000 |
| WO | WO 00/64961 | 11/2000 |
| WO | WO 01/05566 A1 | 1/2001 |
| WO | WO 01/10622 A1 | 2/2001 |
| WO | WO 01/12698 | 2/2001 |
| WO | WO 01/14452 | 3/2001 |
| WO | WO 02/051616 A2 | 7/2002 |
| WO | WO 03/011940 A1 | 2/2003 |
| WO | WO 03/046046 A1 | 6/2003 |
| WO | WO 2004/033174 | 4/2004 |
| WO | WO 2004/055093 | 7/2004 |

OTHER PUBLICATIONS

Ravindranath et al., "Modeling Poly(ethylene terephthalate) Reactors. IX. Solid State Polycondensation Process," J. of Applied Polymer Sci., vol. 39, p. 1325-45 (J. Wiley & Sons Inc. 1990).
Roberts R.C., Poly(ethylene terephthalate) I—Heat of Fusion, Polymer 10, p. 113-16 (1969).
Wunderlich, Bernhard, Macromolecular Physics, vol. 2, p. 1-15, 35-52 (Academic Press, NY 1976).
Yoon et al. "The Diffusion of Ethylene Glycol in Solid State Poly(ethylene terephthalate)," Polymer J., vol. 25, No. 3, pp. 219-226 (1993).
U.S. Appl. No. 11/888,255, filed Jul. 31, 2007.
A.K. Bledzki, "Technical Plastic Materials, Chapter X, Polyethylene Terephthalate," Version 1.2 (Dec. 1998).
Billmeyer, Jr., Fred W. and Saltzman, Max; Describing Color, Chapter 2; Principles of Color Technology, Second Edition, 1981; pp. 25-66; John Wiley & Sons, Inc.; United States of America.
Carl W Fuller, Colored Iron Oxide Pigments, Synthetic, Pigment Handbook, 1973, pp. 333-349, vol. 1, John Wiley & Sons, New York.
Encyclopedia of Polymer Science and Technology, vol. 7, "Metal-Containing Polymers to Rigid-Rod Polymers," John Wiley & Sons, Inc., 2003, pp. 508-509.
Eugene R. Moore, Thomas F. McVey, Robert Davenport, "Polyethylene Terephthalate," Supplement B, SRI Consulting, Dec. 2000, pp. 5-30 and 5-31.
Flory, Paul J., "Molecular Size Distribution in Linear Condensation Polymers," Contribution No. 164 from the Experimental Station of E.I. DuPont de Nemours & Co., Oct. 1936, pp. 1877-1885.
Franz Fourne, Synthetic Fibers, Machines and Equipment, Manufacture, Properties, Handbook for Plant Engineering, Machine Design, and Operation, Hanser Publishers, Munich, 1999,4.3.3, pp. 244-246.
http://www.ecplaza.netftradeleads/seller/5027650/pet_resin_polyester_chips.html, obtained from internet on May 28, 2009.

Kirk-Othmer Encyclopedia of Chemical Technology, Fifth Edition, vol. 20, John Wiley & Sons, Inc., 2006, p. 49.
Kirk-Othmer Encyclopedia of Chemical Technology, Fourth Edition, vol. 19, "Pigments to Powders, Handling," John Wiley & Sons, Inc., 1996, pp. 620-621.
Mallon, Frederick K. and Ray, W. Harmon, "Modeling of Solid-State Polycondensation II Reactor Design Issues," J. Applied Polymer Sci., vol. 69, 1998, pp. 1175-1788.
Shiers, John and Long, Timothy E., "Modern Polyesters: Chemistry and Technology of Polyesters and Copolyesters," Wiley Series in Polymer Science, John Wiley & Sons, Ltd., 2008, pp. 194-242, and pp. 29-115.
Ullmann'S Encyclopedia of Industrial Chemistry, Sixth, vol. 28, "Polyacrylates to Polyurethanes," 2003 Wiley-VCH Verlag GnbH & Co. KGaA, Weinheim, p. 85.
U.S. Appl. No. 11/018,119, filed Dec. 21, 2004.
U.S. Appl. No. 10/986,129, filed Nov. 10, 2004.
U.S. Appl. No. 11/018,357, filed Dec. 21, 2004.
U.S. Appl. No. 11/700,450, filed Jan. 31, 2007.
U.S. Appl. No. 11/361,487, filed Feb. 24, 2006.
U.S. Appl. No. 10/665,664, filed Sep. 18, 2003.
U.S. Appl. No. 10/795,783, filed Mar. 8, 2004.
U.S. Appl. No. 12/257,837, filed Oct. 24, 2008.
Eugene R. Moore, Thomas F. McVey, Robert Davenport, "Polyethylene Terephthalate," Supplement B, SRI Consulting, Dec. 2000, pp. 5-30 and 5-31.
Kirk-Othmer Encyclopedia of Chemical Technology, Fifth Edition, vol. 20, John Wiley & Sons, Inc., 2006, p. 49.
Ullmann'S Encyclopedia of Industrial Chemistry, Sixth, vol. 28, "Polyacrylates to Polyurethanes," 2003 Wiley-VCH Verlag GnbH & Co. KGaA, Weinheim, p. 85.
Franz Fourne, Synthetic Fibers, Machines and Equipment, Manufacture, Properties, Handbook for Plant Engineering, Machine Design, and Operation, Hanser Publishers, Munich, 1999, 4.3.3, pp. 244-246.
Encyclopedia of Polymer Science and Technology, vol. 7, "Metal-Containing Polymers to Rigid-Rod Polymers," John Wiley & Sons, Inc., 2003, pp. 508-509.
Kirk-Othmer Encyclopedia of Chemical Technology, Fourth Edition, vol. 19, "Pigments to Powders, Handling," John Wiley & Sons, Inc., 1996, pp. 620-621.
http://www.ecplaza.net/tradeleads/seller/3937885/pet_chips.html, obtained from internet on May 28, 2009.
http://www.ecplaza.net/tradeleads/seller/5027650/pet_resin_polyester_chips.html, obtained from internet on May 28, 2009.
Google Image Result for http://www.polypakintl.com/images/resin.jpg, obtained from internet on May 28, 2009.
Google Image Result for http://pic.ccn.mofcom.gov.cn/duomeiti/10623031/0031.jpg, obtained from internet on May 28, 2009.
Alibaba Manufacturer Directory—Suppliers, Manufacturers, Exporters & Importers, http://www.alibaba.com/trade/search?SearchText=polyester+chips&Country=&IndexArea..., obtained from internet on May 29, 2009.
Syang-Peng Rwei, Properties of Poly(Ethylene Terephthalate)/Poly(Ethylene Naphthalate) Blends, Polymer Engineering and Science, Dec. 1999, vol. 39, No. 12, pp. 2475-2481.
Stefanos L. Sakellarides, The Effect of Isophthalic Acid Modification on the Thermal Crystallization of PET, Antec 1996, pp. 938-942.
Yoshitsugu Maruhashi, Primary Structure and Physical Properties of Poly(ethylene terephthalate)/Poly(ethylene naphthalate) Resin Blends, Polymer Engineering and Science, Jan. 2003, vol. 43, No. 1.
N. Torres, J.J. Rob, B. Boutevin, Study of thermal and mechanical properties of virgin and recycled poly(ethylene terephthalate) before and after injection molding, European Polymer Journal, 1999, pp. 2075-2080.
Darwin PR Kint, Antxon Martinex De Ilarduy, Abdelilah Alla, Sabastian Munoz-Guerra, Poly(ethylene terephthalate) Terpolyesters Containing Isophthalic and 5-tert-Buylisophthalic Units, 2002, pp. 124-134.
Darwin PR Kint, Antxon Martinez De Ilarduya, Sebastian Munoz-Guerra, Poly(ethylene terephthalate) Copolymers Containing 5-tert-Butyl Isophthalic Units, 2001, pp. 1994-2004.
Darwin PR Kint, Abdelilah Alla, Elise Deloret, Josefina L. Campos, Sebastian Munoz-Guerra, Synthesis, characterization and properties of poly(ethylene terephthalate)/poly(1,4-butylene succinate) block copolymers, 2002, pp. 1321-1330.

Darwin PR Kint, Antxou Martinez De Ilarduya, Antoni Sansalvado, Josep Ferrer, Jose I. Iribarren, Sebastian Munoz-Guerra, Structural Characterization and Thermal Properties of Poly(ethylene terephthalate) Copolymers Containing 2-Butyl-2-ethyl-1,3-propanediol, Journal of Applied Polymer Science, vol. 86 1077-1086, 2002, Wiley Periodicals, Inc.

Yongjian Liu, Crystallization and Melting Behavior of Liquid Crystalline Co-polyesters Based on Modified Poly-[(p-hydroxybenzoic acid)-co-(ethylene terephthalate)], Macromolecular Chemistry and Physics, 2001, 202 No. 4; Wiley-VCH; pp. 488-494.

Jinshu Yu, Der Zhou, and Veimin Chai, Synthesis and Non-Isothermal Crystallization Behavior of Poly(ethylene-co-1,4-butylene terephthalate)s, Macromolecular Research, vol. 11, No. 1 pp. 25-25, 2003.

Eun Jae Hyun, So Hwa Lee, Yeong Soon Gal, Sang Hee Jang, Hyun Kuk Choi, Boo Young Shin, Gil Soo Sur, and Bong Shik Kim, A Study on Fabrication of Polyester Copolymers (IV)—Physical Properties of PET/BPA Copolymer-, Polymer (Korea), vol. 25, No. 2, pp. 208-217, 2001. Korean Article Available Only.

Co-pending U.S. Appl. No. 11/018,119, filed Dec. 21, 2004.
Co-pending U.S. Appl. No. 11/018,357, filed Dec. 21, 2004.
Co-pending U.S. Appl. No. 10/795,783, filed Mar. 8, 2004.

* cited by examiner

SPHEROIDAL POLYESTER POLYMER PARTICLES

CROSS REFERENCE TO RELATED APPLICATIONS

This application is a Divisional application of Ser. No. 11/018,357, filed Dec. 21, 2004, and now abandoned, which application claims the benefit of U.S. Provisional Application No. 60/606,727 filed Sep. 2, 2004, and U.S. Provisional Application No. 60/618,951 filed Oct. 15, 2004, the entirety of which is hereby incorporated by reference.

1. FIELD OF THE INVENTION

The field of the invention pertains to polyester polymer particles having a particular morphology and geometry.

2. BACKGROUND OF THE INVENTION

Conventional polyester polymer particles and pellets are typically cylindrically shaped, are solid state polymerized, and have high degrees of crystallinity. As a result, conventional pellets do not usually agglomerate in the dryers which feed an injection molding machine or an extruder. While some sticking occurs at drying temperatures (150° C. to 185° C.), the problem does not usually result in sufficient agglomeration to completely block a flow of pellets from the dryer.

We have found it advantageous to provide a polyester polymer particle which has a unique morphology and which avoids the need for solid state polymerization. This morphology includes one or more of the following features: low melt point, low degree of crystallinity, and high It.V. produced without solid state polymerization. We have discovered that these particles, if made in a conventional shape, may in some cases stick sufficiently in the dryer that mechanical agitation is required to dislodge them. We have seen that cylindrical solid stated pellets were free flowing in dryer hoppers, while in some cases cylindrical non-solid stated pellets with the unique morphology agglomerated in the pellet dryers.

This investigation would have led one to conclude that the free flowing behavior of the pellets is attributable to their morphology, and not their geometry. Our investigation continued to determine the cause for the sticking problem of these pellets. It would be desirable to provide a polyester polymer particle which minimizes agglomeration in the dryer and which has one or more of the stated characteristics.

3. SUMMARY OF THE INVENTION

We have surprisingly discovered that when a polyester particle with a unique morphology is employed, the geometry of the particle, unlike conventional solid state highly crystalline pellets, plays a significant role in reducing agglomeration of the particles in a dryer. The geometry of the particle of this invention is spheroidal. Thus, there is now provided a bulk of spheroidal polyester polymer pellets having:
  A) an average It.V. of at least 0.72 dL/g, and either
  B) melting points characterized by:
    (i) at least two melting peaks, wherein one of said at least two melting peaks when measured on a DSC first heating scan is a low peak melting point having a peak temperature within a range of 140° C. to 220° C. and having a melting endotherm area of at least the absolute value of 1 J/g, or
    (ii) having one or more melting points which, when measured on a DSC first heating scan, has a heating curve departing from a baseline in the endothermic direction at a temperature of less than or equal to 200° C., or
  C) a low degree of crystallinity within a range of at least 20% and a maximum degree of crystallinity $T_{cmax}$ defined by the equation:

$$T_{cmax} = 50\% - CA - OH$$

where CA is the total mole % of all carboxylic acid residues other than terephthalic acid residues, based on 100 mole % of carboxylic acid residues in the polyester polymer, and OH is the total mole % of hydroxyl functional compound residues other than ethylene glycol residues, based on 100 mole % of the hydroxyl functional compounds residues; or both B) and C); and optionally but preferably
  D) 10 ppm or less of residual acetaldehyde.

There is also provided a method for making the spheroids.
There is also provided a method for drying and melt processing the spheroids by:
  A) drying polyester polymer spheroids in a drying zone to produce dried spheroids;
  B) introducing the dried spheroids into a melting zone;
  C) melting the polyester polymer spheroids in the melt processing zone, and
  D) forming an article from the molten polymer;
wherein the polyester polymer spheroids introduced into the drying zone are not solid state polymerized and optionally have one or more of the characteristics described above.

The spheroids in this embodiment also preferably are within the range of crystallinity mentioned above.

There is also provided the bottle preforms and stretch blow molded bottles made from the spheroids mentioned above or made by any one of the process embodiments mentioned above.

4. BRIEF DESCRIPTION OF THE DRAWINGS

Figure 2:
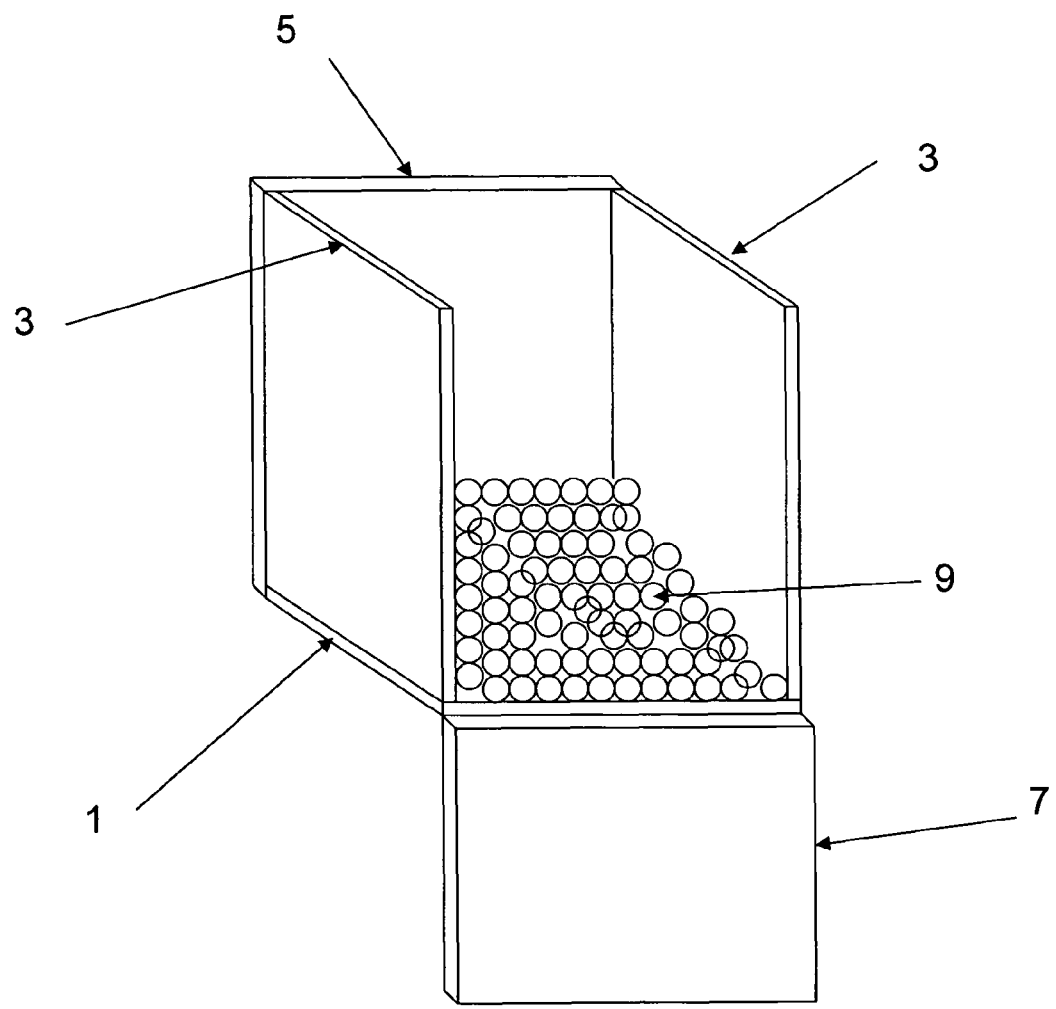
Figure 3:
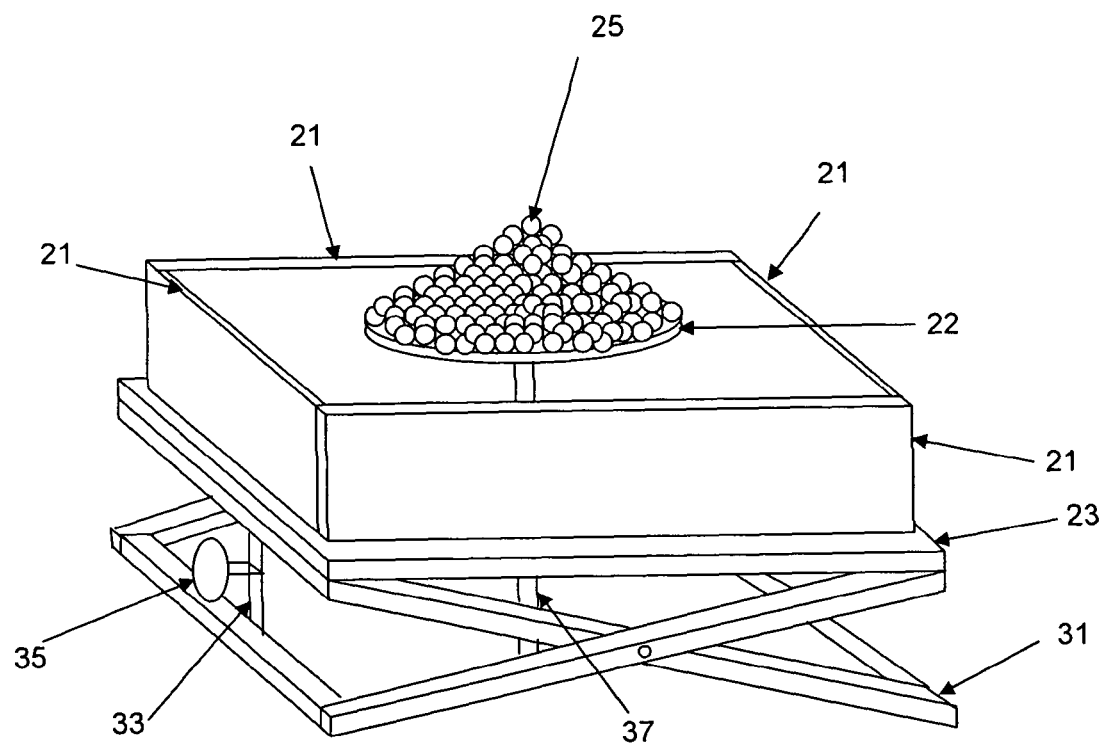
Figure 4:
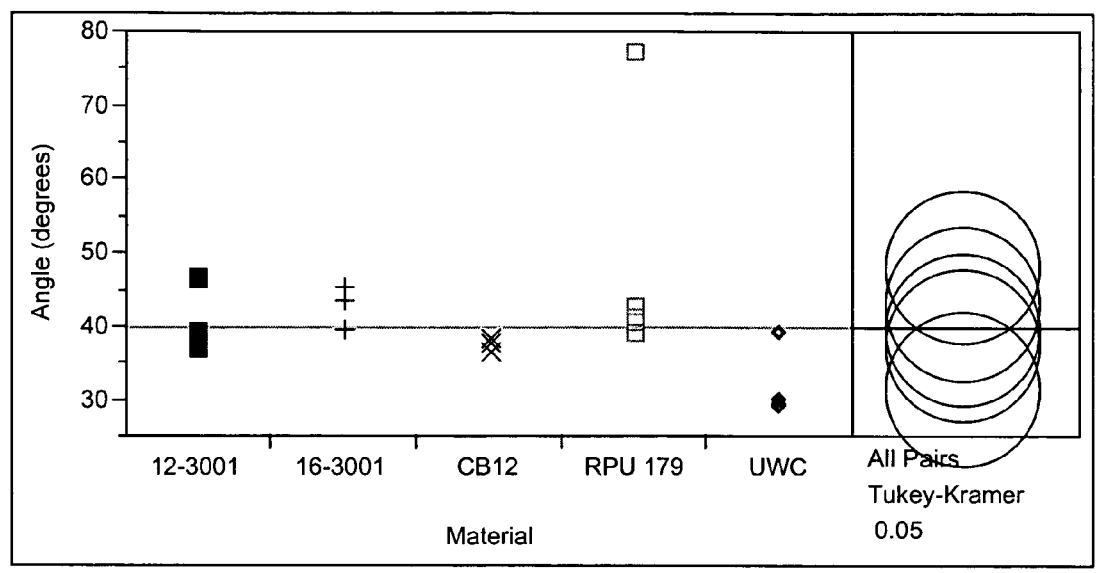
Figure 5:
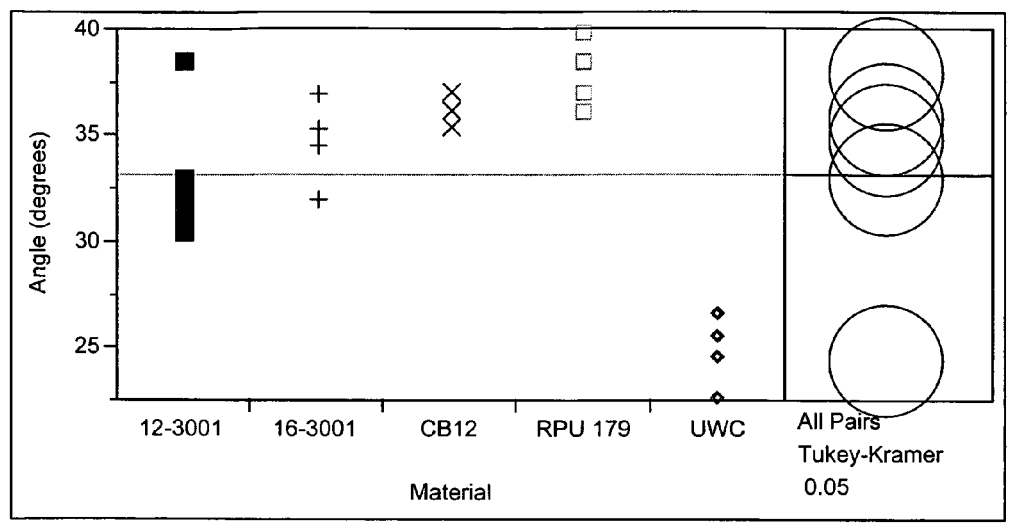

FIG. 1 illustrates the geometry and dimensions in inches of the dryer hopper used in the experiments.
FIG. 2 illustrates the gate test apparatus for the testing the angle of repose of granular materials.
FIG. 3 illustrates the heap test apparatus for the testing the angle of repose of granular materials.
FIG. 4 shows a comparison of the angles of repose for the five materials studied by the gate test method.
FIG. 5 shows a comparison of the angles of repose for the materials studied by the heap test method.

5. DETAILED DESCRIPTION OF THE INVENTION

The present invention may be understood more readily by reference to the following detailed description of the invention. It is to be understood that this invention is not limited to the specific processes and conditions described, as specific processes and/or process conditions for processing plastic articles as such may, of course, vary.

It must also be noted that, as used in the specification and the appended claims, the singular forms "a", "an" and "the" include plural referents. For example, reference to processing a thermoplastic "preform", "article", "container", or "bottle" is intended to include the processing of a plurality of thermoplastic preforms, articles, containers or bottles. Reference to processing a polymer at a stated temperature or with a heating element includes other temperatures and additional heating elements, if desired, in addition to the one stated at different times throughout the processing history unless otherwise stated. References to a composition containing "an" ingredient or "a" polymer is intended to include other ingredients or other polymers, respectively, in addition to the one named.

Ranges may be expressed herein as "within" or "between" or from one value to another. In each case, the end points are included in the range. Ranges expressed as being greater than or less than a value exclude the end point(s).

By "comprising" or "containing" or "having" is meant that at least the named compound, element, particle, or method step etc must be present in the composition or article or method, but does not exclude the presence of other compounds, materials, spheroids, method steps, etc, even if the other such compounds, material, spheroids, method steps etc. have the same function as what is named.

Regardless of the context, the expression of a temperature means the temperature applied to the polymer unless otherwise expressed as the "actual" polymer or melt temperature.

It is also to be understood that the mention of one or more method steps does not preclude the presence of additional method steps or intervening method steps between those steps expressly identified.

The intrinsic viscosity values described throughout this description are set forth in dL/g units as calculated from the inherent viscosity measured at 25° C. in 60/40 wt/wt phenol/tetrachloroethane. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}\ln(\eta_r/C)$$

where $\eta_{int}$=Intrinsic viscosity
$\eta_r$=Relative viscosity=$t_s/t_o$
$\eta_{sp}$=Specific viscosity=$\eta_r-1$ Instrument calibration involves replicate testing of a standard reference material and then applying appropriate mathematical equations to produce the "accepted" Ih.V. values.

$$\text{Calibration Factor} = \frac{\text{Accepted } Ih.V. \text{ of Reference Material}}{\text{Average of Replicate Determinations}}$$

Corrected Ih.V.=Calculated Ih.V.×Calibration Factor

The intrinsic viscosity (It.V. or $\eta_{int}$) may be estimated using the Billmeyer equation as follows:

$$\eta_{int}=0.5[e^{0.5\times Corrected\ Ih.V.}-1]+(0.75\times \text{Corrected Ih.V.})$$

In one embodiment, there is provided a bulk of spheroidal polyester polymer pellets having:
A) an average It.V. of at least 0.72 dL/g, and either
B) melting points characterized by:
  (i) at least two melting peaks, wherein one of said at least two melting peaks when measured on a DSC first heating scan is a low peak melting point having a peak temperature within a range of 140° C. to 220° C. and having a melting endotherm area of at least the absolute value of 1 J/g, or
  (ii) having one or more melting points which, when measured on a DSC first heating scan, has a heating curve departing from a baseline in the endothermic direction at a temperature of less than or equal to 200° C., or
C) a low degree of crystallinity within a range of at least 20% and a maximum degree of crystallinity $T_{cmax}$ defined by the equation:

$$T_{cmax}=50\%-CA-OH$$

where CA is the total mole % of all carboxylic acid residues other than terephthalic acid residues, based on 100 mole % of carboxylic acid residues in the polyester polymer, and OH is the total mole % of hydroxyl functional compound residues other than ethylene glycol residues, based on 100 mole % of the hydroxyl functional compounds residues; or
both B) and C).

The polyester polymer composition is in its isolated form since a degree of crystallinity is imparted, as opposed to polyester compositions in a melt phase process or as a melt in the extruder since as a melt, crystallinity disappears.

The polyester polymer particles are in the shape of spheroids. A spheroid is a particle which is spherical or nearly spherical or globular in shape. It is substantially but imperfectly spherical and can be distinguished from slabs, cylinders, pastilles, cones, rods, or irregular shaped particles having corners. Spheroids have a combination of characteristics. For example, spheroids will not stand on either end of the long axis through their center, and they preferably but not necessarily have a y/x ratio of less than 2, where y is the long axis and x is the short axis. Also, when 10.0 g of pellets are placed near one edge of a smooth horizontal steel plate in a grouping one pellet thick, and the plate is smoothly and gradually elevated at that edge to tilt the plate, spheroids will roll from the plate such that no more than 0.5 g of pellets remain on the plate when the plate first makes an angle of 13 degrees with respect to the horizontal. The spheroids may be spherical, elliptical, oval, and may have tails to them.

In one embodiment, the spheroids have a peak mode in a roundness distribution less than 1.4, or less than 1.3, or less than 1.2. The roundness of a spheroid is defined as perimeter$^2$/($4\pi\times$area). "Perimeter" and "area" are defined in the context of a cross-sectional view of a spheroid.

The spheroid particles can be made by underwater cutting molten polymer flowing through a die into a water housing and cut by blades as the molten stream is forced through the die holes. With underwater cutting, the spheroids are typically not perfectly spherical and usually have a slight tail where they are cut and swept away from the die plate in current of water or other suitable liquid.

The spheroids desirably have a number average weight of at least 0.10 g per 100 spheroids, more preferably greater than 1.0 g per 100 spheroids, and up to about 100 g per 100 spheroids. The volume of the spheroids is not particularly limited, but in one embodiment, there is provided a bulk of spheroids occupying a volume of at least 1 cubic meter, or at least 3 cubic meters, or at least 5 cubic meters.

The "bulk" of polyester polymer spheroids is at least 10 isolated spheroids, preferably within the weight and volume ranges expressed above. The bulk of polyester spheroids exhibit the characteristics expressed herein as an average across a random sampling of 10 or more spheroids in the bulk of spheroids. As in any manufacturing process, it is possible to obtain anomalous spheroids which exhibit characteristics either inside or outside of those stated herein. The spheroids of the invention, however, exhibit the stated characteristics across a bulk, and these characteristics can be measured by taking a random sampling of at least ten spheroids and determining the stated characteristics as an average across the ten spheroids. All ten spheroids may be measured together in one analysis, or each spheroid may be separately analyzed.

The bulk of polyester polymer spheroids is desirably packaged into a container. Examples of suitable containers to hold the spheroids are storage silos to hold the spheroids while they await shipment from one location to another. Another example of a container is a dryer hopper attached to an extruder or injection molding machine. Another example of a container to hold the spheroids is a shipping container, such as a Gaylord box, a crate, a railcar, a trailer that can be attached to a truck, a drum, a cargo hold on a ship, or any other suitable package used to transport spheroids. Thus, there are provided containers with spheroids which are finished and ready for shipment or in shipment to a customer for converting the pellets to an article. The spheroids have been subjected by the particle manufacturer to all the processing conditions needed to produce a particle with characteristics acceptable to its customers who convert the pellets to articles. In the embodiment where the pellets may occupy a dryer hopper, the converter of pellets places the bulk of the pellets into the dryer hopper and removes residual moisture from the pellets to prevent excessive IV degradation during melt processing.

In all these embodiments, the spheroids in the containers have at a minimum the following characteristics:

A) an average It.V. of at least 0.72 dL/g,
and either
B) melting points characterized by:
  (i) at least two melting peaks, wherein one of said at least two melting peaks when measured on a DSC first heating scan is a low peak melting point having a peak temperature within a range of 140° C. to 220° C. and having a melting endotherm area of at least the absolute value of 1 J/g, or
  (ii) having one or more melting points which, when measured on a DSC first heating scan, has a heating curve departing from a baseline in the endothermic direction at a temperature of less than or equal to 200° C., or
C) a low degree of crystallinity within a range of at least 20% and a maximum degree of crystallinity $T_{cmax}$ defined by the equation:

$$T_{cmax}=50\%-CA-OH$$

where CA is the total mole % of all carboxylic acid residues other than terephthalic acid residues, based on 100 mole % of carboxylic acid residues in the polyester polymer, and OH is the total mole % of hydroxyl functional compound residues other than ethylene glycol residues, based on 100 mole % of the hydroxyl functional compounds residues; or
both B) and C), and preferably
D) a residual level of acetaldehyde of 10 ppm or less.

In a preferred embodiment, the bulk of spheroids are not solid state polymerized, and in a more preferred embodiment, there is provided a bulk of spheroids in a container, most preferably a shipping container, which have not been solid state polymerized.

The polyester polymer spheroids are solid at 25° C. and 1 atmosphere. The polyester spheroids have sufficient melt strength to make them suitable for container applications such as bottles and trays. The It.V. of the polyester spheroids is at least 0.72 dL/g. For example, the It.V. of the polyester spheroids can be at least 0.75 dL/g, or at least 0.78 dL/g, or at least 0.81 dL/g, and up to about 1.2 dL/g, or 1.1 dL/g. In a related embodiment, the polyester polymer spheroids described above have an It.V. of at least 0.75 dL/g.

The polyester polymer of the invention desirably contains alkylene terephthalate or alkylene naphthalate repeat units in the polymer chain. More preferred are polyester polymers which comprise:

(a) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 80 mole % of the residues of ethylene glycol or propane diol, based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said product(s) add up to 100. The residues of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In a preferred embodiment, the polyester polymer comprises:

(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, and (b) a hydroxyl component comprising at least 90 mole %, or at least 92 mole %, or at least 96 mole % of the residues of ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalene dicarboxylic acid include $C_1$-$C_4$ dialkylterephthalates and $C_1$-$C_4$ dialkylnaphthalates, such as dimethylterephthalate and 2,6-dimethylnaphthalate.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane, and 2,2-bis-(4-hydroxypropoxyphenyl)-propane.

As modifiers, the polyester polymer may preferably contain such comonomers as isophthalic acid, naphthalene dicarboxylic acid, cyclohexanedimethanol, and diethylene glycol.

The polyester pellet compositions may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or spheroids, fibers, impact modifiers, or other polymers which may form a discontinuous phase). It is also preferred that the polyester polymers do not contain any fillers, fibers, or impact modifiers or other polymers which form a discontinuous phase.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst.

Once the polyester polymer is manufactured in the melt phase polymerization, it is solidified into spheroids. The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer is cut at the die head underliquid. The polyester polymer melt is optionally filtered to remove particulates over a designated size before being cut. Any other conventional technique known to make spheroids can be used.

The polyester polymer of the invention is partially crystallized to produce semi-crystalline spheroids. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized. Optionally, the crystallized polyester spheroids may be solid stated according to known methods The crystallization and annealing are effective to impart the desired degree of crystallinity and melting point characteristics to the polyester polymer. In one embodiment, the polyester polymer particles have at least two melting peaks on a DSC first heating scan, wherein one of said at least two melting peaks is a low peak melting point with a peak temperature within a range of 140° C. to 220° C. and having a melting endotherm area of at least the absolute value of 1 J/g. By melting point is meant the peak temperature of endotherms on a differential scanning calorimeter (DSC) which increases the temperature upward at a rate of 20° C./min on a sample weighing about 10 mg. It is not necessary to run a DSC analysis on the particles, but only that the particles have the stated morphology. The stated tests reveal the properties of the polymer and need only be run to determine whether or not a polymer has or does not have the stated characteristics.

In this embodiment where the polyester polymer particles exhibit at least two melting peaks, the low peak melting point is considered to be $T_{m1a}$ as explained further below, which is classified as a melting peak when the area under the heating curve on a DSC first heating scan is at least the absolute value of 1 J/g. If the area under the curve is less than 1 J/g, the uncertainty around whether a curve is truly a peak or not becomes too high. Moreover, one can determine that at least two peaks exist when the endotherm(s) on a DSC scan exhibit at least four slopes, a first slope departing from a baseline, a second slope of opposite sign from the first slope, and a third slope of opposite sign from the second slope, and a fourth slope of opposite sign from the third slope. The temperature location of the peaks on each curve define the melting points on that heating curve. For the purposes of computing the area of the melting endotherms, the dividing point between two peaks is at the point between the peaks where the curve most closely approaches the baseline.

In this embodiment, if two or more peaks appear on a heating curve from a DSC first heating scan, then the first peak is the low peak melting point $T_{m1a}$, and the second peak is the high peak melting point $T_{m1b}$ such that $T_{m1a} < T_{m1b}$. The low peak melting point of the polymer particles is within a range of 130° C. to 220° C. Preferably the low peak melting point of the polyester polymer has a peak temperature of at least 140° C., or at least 150° C., or at least 160° C., or at least 170° C., and does not exceed 210° C., or 200° C., or 195° C.

In some cases, particularly at low crystallinity due to crystallization at relatively low temperatures and/or for short times, rearrangement of crystals can occur so rapidly in the DSC instrument during first heating scans with scan rates of 20° C./min that the low melting point is not detected. The low melting point can then be seen by increasing the temperature ramp rate of the DSC instrument and using smaller samples. If the sample has a low melting peak, it will be seen at higher scan rates. Scan rates up to 500° C./min can be used. For solid-stated samples that experienced relatively high temperatures for relatively long times and exhibit only a single melting peak at a 20° C./min scan rate, no low melting peak is expected even at higher scan rates.

In some instances, depending on the specific thermal history of the polyester resin pellets, the DSC heating curve obtained upon a DSC first heating scan may exhibit an endothermic shoulder on the low-temperature side of the principal endothermic melting peak rather than two separate and well defined melting peaks. A low-temperature endothermic shoulder of this type is defined by means of the curve obtained by taking the first derivative with respect to temperature of the original DSC curve. The shoulder appears as a peak in the derivative curve. With increasing temperature, the derivative curve departs the baseline (at temperature A) in the endothermic direction at a temperature preferably less than or equal to 200° C., or less than or equal to 190° C., or less than or equal to 180° C., then achieves a maximum displacement from the baseline, and then reverses direction and approaches or returns to the baseline but does not cross the baseline. At still higher temperatures, the derivative curve reverses direction (at temperature B) and again bends towards the endothermic direction, marking the beginning of the primary melting peak in the original DSC curve. The heat of melting represented by the shoulder corresponds to the area under the original DSC curve between temperatures A and B, and must be greater than or equal to the absolute value of 1 J/g to be considered a true shoulder. Those skilled in the art recognize that minor instrumental noise in the original DSC curve can appear as high-amplitude short-duration spikes in the derivative curve. Such noise can be filtered out by requiring that all features in the derivative curve spanning less than 5° C. be ignored.

Extremely high melting points, e.g. those on the order of 230° C. or more, are not needed to effectively dry the polyester polymer particles at temperatures ranging from 140-190° C. as once thought. Now there is provided a polymer particle which is both crystallized and has a lower melting point to provide the flexibility, if one so chooses, of lowering the melt processing temperature by 1° C. or more, or by about 3° C. or more, and thereby reduce the level of acetaldehyde generated without having to lower the drying temperature in the dryer hopper feeding the melt processing zone. Even though the potential exists for particles having a melting point of 230° C. or more to be dried at higher temperatures on the order of 200° C. or more, the practical drying temperature limit is about 190° C. in any case because at above 190° C., the particle begins to discolor in air. Also, it is desirable to use pellets which provide the flexibility of lowering the peak set-point temperature to the heating elements. Either course of action, or both combined, will lower the amount of acetaldehyde generated in the melt processing zone, and also will decrease the cooling time required for a molded article.

In another embodiment, the polymer particles may have one or more melting points which, when measured on a DSC first heating scan, have a heating curve departing from a baseline in the endothermic direction at a temperature of less than or equal to 200° C., or less than or equal to 190° C., or less than or equal to 180° C. In this embodiment, the DSC heating curve may exhibit only one melting point, or it may exhibit two melting points. In any event, the heat history of the particles is such that they exhibit at least one melting point which, when measured on a DSC first heating scan, displays a heating curve which begins to depart from the baseline at a temperature of less than or equal to 200° C. In this embodiment, the area of the endotherm curve represented by the melting peak departing from the baseline below or equal to 200° C. is at least the absolute value of 1 J/g.

In all embodiments, the area of the endotherm curve may be at least the absolute value 1.5 J/g, or at least the absolute value 2 J/g.

In a preferred embodiment, the crystallizer conditions are adjusted to produce polymer particles having a degree of crystallinity within a range of at least 20% and a maximum degree of crystallinity $T_{cmax}$ defined by the equation:

$$T_{cmax} = 50\% - CA - OH$$

where CA is the total mole % of all carboxylic acid residues other than terephthalic acid residues, based on 100 mole % of carboxylic acid residues, and OH is the total mole % of all hydroxyl functional compound residues other than ethylene glycol residues, based on 100 mole % of hydroxyl functional compounds residues. The degree of crystallinity in the polyester composition is less than that found in conventional commercial pellets which normally exceed 55%, and even more than 60%. At a degree of crystallinity less than 20%, the tendency of the particles to stick to each other and to the dryer equipment is too great. By maintaining the degree of crystallinity within the limits expressed above, in combination with the other features of the invention, energy costs in the melt processing zone are reduced, such as the amperage to the screw motor or the power to the heating elements.

In the preferred embodiment wherein the polyester polymer is crystallized to a degree within the formula, a polymer containing solely terephthalic acid and ethylene glycol residues, also commonly known in this industry as a homopolymer, can attain a maximum degree of crystallinity of 50%. A polyester polymer modified with a starting material other than terephthalic acid or ethylene glycol will have a degree of crystallinity less than 50%. For example, a polyethylene terephthalate polymer modified with 2 mole % isophthalic acid residues and 2.7 mole % diethylene glycol residues will have a maximum degree of crystallinity of 45.3% (50−2−2.7).

More preferably, the pellets are crystallized to a degree of crystallization of at least 25%, or at least 30%, or at least 32%. While there is no preferred upper limit below the maximum degree of crystallinity calculated as set forth in the formula, in many cases the degree of crystallinity does not exceed 45%, or not more than 40%.

Pellet melting temperature and the degree of crystallinity are determined using Differential Scanning Calorimetry (DSC). The sample weight for this measurement is 10±1 mg and the sample consists of either (1) a portion of a single pellet, or more preferably (2) a sample taken from several grams of cryogenically ground pellets. The first heating scan is performed. The sample is heated from approximately 25° C. and proceeds upward to about 290° C. at a rate of 20° C./minute. The absolute value of the area of the melting endotherms (one or more) minus the area of any crystallization exotherms is determined. This area corresponds to the net heat of melting and is expressed in Joules/gram. The heat of melting of 100% crystalline PET is taken to be 119 Joules/gram, so the weight fraction crystallinity of the pellet is calculated as the net heat of melting divided by 119. To obtain the weight. % crystallinity, the weight fraction crystallinity is multiplied by 100. Unless otherwise stated, the melting point in each case is also determined using the same DSC scan.

The percent crystallinity is calculated from both of:

Low peak melting point: $T_{m1a}$
High peak melting point: $T_{m1b}$

Note that in some cases, particularly at low crystallinity due to crystallization at relatively low temperatures and/or short times, rearrangement of crystals can occur so rapidly in the DSC instrument during first heating scans with scan rates of 20° C./min that the true, lower melting point is not detected. The lower melting point can then be seen by increasing the temperature ramp rate of the DSC instrument and using smaller samples. A Perkin-Elmer Pyris-1 calorimeter is used for high-speed calorimetry. The specimen mass is adjusted to be inversely proportional to the scan rate. About a 1 mg sample is used at 500° C./min and about 5 mg are used at 100° C./min. Typical DSC sample pans are used. Baseline subtraction is performed to minimize the curvature in the baseline.

The low peak melting point and degree of crystallinity of the polyester polymer are obtained by and influenced by a number of crystallization conditions and other factors. These conditions and factors include controlling the temperature conditions applied to the polymer during crystallization, the residence time within the crystallization zone, the nature of the polymer, the efficiency of the medium used to crystallize the polymer, and the strain undergone by the polymer. Those of skill in crystallizing polyester polymer are aware of the suitable conditions in conventional crystallizers to adjust the melting point and the degree of crystallinity, and can obtain polymers having a melting point and a degree of crystallinity within the stated ranges for a given polymer composition. For example, mild thermal crystallization temperatures of 100° C. to 200° C. can be used at residence times ranging from 1 minute to 3 hours, the exact conditions depending upon the nature of the polymer. While these variables affect both the melting point and the degree of crystallization of the polymer, not all polyester polymers crystallized to the same degree of crystallinity will have the same melting points, and not all polyester polymers having the same melting points will necessarily have the same degree of crystallinity. Polyester polymers of varying compositions will attain different melting points from other polyester polymers even at the same degrees of crystallinity. Processing separate samples of compositionally identical polyester polymers at varying residence times under the same temperature conditions will also produce polyester polymers with varying degrees of crystallinity. Accordingly, the degree of crystallization can vary among two polymers of the same composition. Also, the melting point can vary among two polymers of different composition even if their degree of crystallinity is identical.

The polyester polymer composition is preferably made from at least 75% virgin polyester polymer, more preferably at least 78 wt. %, and can be 89 wt. % or more, or 95 wt. % or more virgin material, or entirely of virgin material. Virgin material may include scrap or regrind polymer, but is distinguished from post consumer recycle polymer. However, while virgin material may contain scrap or regrind material, in one embodiment, scrap or reground material is absent from the virgin polymer.

In addition to the melt phase polymerization process described above to make the virgin polyester polymer to a molecular weight suitable for container applications, i.e. It.V.=1>0.72 dL/g, followed by thermal crystallization at relatively mild temperatures, e.g. 100° C. to 200° C., other processes can also be used to make the polymer compositions of the invention. For example, a virgin polymer with a level of crystallinity and melting point outside of the ranges can be remelted, for example in an extruder, followed by thermal crystallization at relatively mild temperatures (100 to 200° C.). Alternatively, following melt-phase polymerization to an intermediate molecular weight (It.V. of 0.20 dL/g to 0.70 dL/g), the polyester can be crystallized at mild temperatures to a degree of crystallization within the stated range, followed by solid-state polymerizing also at mild temperatures ranging from 170° to 200° C. to increase the It.V. to that suitable for container applications, although in this latter case, the residence time in the solid state polymerization zone is either increased, the pressure further decreased, the inert gas flow rate increased, or any combination thereof.

Preferably, the polyester polymer is manufactured in a melt phase polycondensation reaction to an It.V. of at least 0.72 dL/g. In another preferred embodiment, there is provided a shipping container containing polyester spheroids which have not been solid-state polymerized and have the It.V., melting point, and AA characteristics described herein. In another embodiment, the spheroids are fed into a dryer followed by melt processing the spheroids to form an article, in which the spheroids have not been solid-state polymerized and have the characteristics described above.

These embodiments are preferred because pellets subjected to a solid state polymerization process are typically first crystallized to impart a degree of crystallinity and a melting point sufficiently high to avoid sticking at the high temperature conditions applied in the solid state polymerization zone. The crystallization process preceding a solid state polymerization process generally imparts to the pellets high degrees of crystallinity to mitigate agglomeration in the solid state reactors which run at high temperatures. The pellets obtained from the solid stating process generally have high melting points of about 220° C. or more. The high melting points have the disadvantage of increasing the temperature of the polymer melt in the extruder by a few degrees, thereby increasing the cooling time required for molded products which can increase the cycle time of the machine and increase the potential for more acetaldehyde formation. In addition, pellets obtained from solid state polymerization processes also tend to have a high degree of crystallinity, in excess of about 50%, which increases the latent heat of fusion, thereby increasing the energy required to melt the spheroids. Finally, in the solid state polymerization process, the high temperatures applied to the polymer for long times can at times actually over-anneal the polymer, with the effect that some spheroids do not completely melt in the melt processing zone and thereby cause deformities in the molded or extruded product. Accordingly, it is preferred not to solid state polymerize the spheroids, and to provide spheroids with suitable It.V. made in the melt phase process for the production of the spheroids.

The polyester spheroids of the invention preferably contain 10 ppm or less acetaldehyde (as measured by ASTM F2013-00 "Determination of Residual Acetaldehyde in Polyethylene Terephthalate Bottle Polymer Using an Automated Static Head-Space Sampling Device and a Capillary GC with a Flame Ionization Detector"), and more desirably, about 7 ppm or less, or 3 ppm or less residual acetaldehyde ("AA"). This may be accomplished by gas stripping the AA from the spheroids. Alternatively or in addition to gas stripping, an acetaldehyde scavenger may be added to the polymer, which has the attendant advantage of also reducing the acetaldehyde generation rate. If the scavenger is added after the AA stripping is essentially complete, the scavenger will lower the amount of AA in the molded article, such as a bottle perform, by reacting with AA that is formed upon melting. If an excess of scavenger is added prior to the AA stripping or instead of the AA stripping, there may be some that is not consumed and can lower the amount of AA in the molded article. Alternatively, there may be two or more addition points for an AA scavenger.

In a gas stripping operation, a gas such as air or an inert gas such as nitrogen is contacted with the polyester polymer spheroids either co-current or countercurrent, preferably countercurrent to the flow of the spheroids in a vessel in a continuous or batchwise process, preferably a continuous process. The temperature of the gas introduced into the AA stripping vessel is not particularly limited, but preferably from ambient to 40° C., and more preferably about ambient. The temperature of the gas exiting the stripping vessel will approximate the temperature of the pellets introduced into the vessel. Thus, if spheroids are introduced at 100° C., the exit temperature of the gas will be about 100° C.+/−20° C. The temperature of the gas exiting the vessel should not exceed the temperature at which the molecular weight of the spheroids is advanced in the solid state. The residence time of the spheroids depends on the gas temperature and spheroid mass/gas ratio, but in general, the residence time ranges from 1 hour to 24 hours. The gas composition is not particularly limited, and includes nitrogen, carbon dioxide, or ambient air. The gas does not need to be dried, since the function of the gas is not to dry the pellets but to strip residual AA from the pellets. If desired, however, the gas may be dried.

While gas stripping of acetaldehyde may also occur in the dryer feeding the extruder for making an article, it is preferred to feed the dryer with polymer spheroids already having 10 ppm or less of residual acetaldehyde in order to reduce the gas flow used in the dryer and/or improve the quality of the articles made from the extruder. Moreover, in an AA stripping process, dry gas is not required to strip the AA from the spheroids, whereas in a drying process, a stream of dried air is circulated through the spheroids primarily to reduce the moisture on or in the spheroids with the secondary advantage of also removing AA. Thus, in an AA stripping process, ambient air can be and preferably is used as the stripping medium.

Thus, in one embodiment, spheroids having an It.V. of at least 0.72 dL/g and either a degree of crystallinity within a range of 20% to $T_{cmax}$, or a low peak melting point in the range of 130° C. to 220° C., or both, are fed to a vessel, preferably through the upper end of a vessel, as hot spheroids (e.g. 100° C. to 180° C.) to increase the efficiency of AA stripping and form a bed of pellets flowing by gravity toward the bottom end of the vessel while a countercurrent flow of gas such as ambient air is circulated through the bed, said gas introduced into the vessel at a temperature ranging from ambient conditions to 180° C., or ambient to 40° C., to thereby reduce the level of residual AA on the spheroids introduced into the vessel. The spheroids are withdrawn from the vessel within about 5 to 30 hours of their introduction into the countercurrent stream of gas. While the vessel can be pressurized, it is preferably not pressurized except by the pressure created from the gas flow. The vessel is desirably operated at about 0-5 psig, or ambient pressure.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to reduce the level of acetaldehyde in the particles fed to the vessel. Preferably, the gas introduction point is to the lower half of the bed height in the vessel, and more preferably to the lower ¼ of the bed height. The gas flows through at least a portion of the particle bed, preferably through at least 50 volume % of the bed, more preferably through at least 75% of the particle bed volume. Any gas is suitable for use in the invention, such as air, carbon dioxide, and nitrogen. Some gases are more preferred than others due to the ready availability and low cost. For example, the use of air rather than nitrogen would lead to significant operating cost improvements. It was believed that the use of nitrogen gas was required in operations which pass a hot flow of gas through a bed of particles at temperatures above 180° C., such as in a crystallizer, because nitrogen is inert to the oxidative reactions which would otherwise occur between many polyester polymers and ambient oxygen resulting in pellet discoloration. However, by keeping the process temperature low such that the gas exiting the vessel does not exceed 190° C., particle discoloration is minimized. In one embodiment, the gas contains less than 90 vol % nitrogen, or less than 85 vol % nitrogen, or less than 80 vol % nitrogen. In another embodiment, the gas contains oxygen in an amount of 17.5 vol % or more. The use of air at ambient composition (the composition of the air at the plant site on which the vessel is located), or air which is not separated or purified, is preferred. Desirably, ambient air is fed through the gas inlet. While the air can be dried if desired, it is not necessary to dry the air since the object is to remove acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel is preferably insulated to retain heat. The gas inlet and the finished particle outlet are desirably located below the gas outlet and the particle inlet, preferably with the gas outlet and particle inlet being toward the top of the vessel and the gas inlet and finished particle outlet being toward the bottom of the vessel. The gas is desirably introduced into the bed within the vessel at about ½ or ¼ of the bed height within the vessel. The particles are preferably introduced at the top of the vessel, and move by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the vessel containing the particles within the stripping zone. The vessel preferably has an aspect ratio L/D of at least 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle outlet as the particles are fed to the vessel.

A suitable gas flow rate introduced into the vessel and passing through at least a portion of the particle bed is one which is sufficient to reduce the amount of residual acetaldehyde on the particles introduced into the vessel. For example, for every one (1) pound of particles charged to the vessel per hour, suitable gas flow rates introduced into the vessel are at least 0.0001 standard cubic feet per minute (SCFM), or at least 0.001 SCFM, or at least 0.005 SCFM. High flow rates are also suitable, but not necessary, and the gas flow rate should be kept sufficiently low to avoid unnecessary energy consumption by the gas pumps, fans, or blowers. Moreover, it is not desired to unduly cool the particles or dry the particles because the achievement of either or both of these objectives typically requires the use of high gas flow rates to achieve. The gas flow rate is preferably not any higher than 0.15 SCFM, or not higher than 0.10 SCFM, or not higher than 0.05 SCFM, or even not higher than 0.01 SCFM for every one (1) pound of charged particles per hour.

Alternatively, or in addition, an acetaldehyde scavenger may be added to the polyester polymer either near the end of the melt-phase production of the polymer or by melt blending the high IV spheroids with the scavenger. Addition of scavenger to the melt-phase production of polymer should be done as late as possible, preferably near the end of the finisher stage, i.e., near the end of the last stage under vacuum, or more preferably after the finisher stage. Compounding to form polymer concentrates with relatively high loadings of an acetaldehyde scavenger is known in the art. The polyester concentrate contains at least about 0.5 wt. % of the scavenging component in the polyester. These concentrates can be added via an extruder, or liquid dispersions of said scavenging component can be added via a pump, near the end of the melt-phase production of the polymer while the polymer is still molten. Alternatively, these polymer concentrate particles can be blended with polymer spheroids at temperatures which maintain both types of particles in the solid phase. The blend of concentrate and polymer spheroids can then be fed to an extruder, preferably an extruder used to mold plastic articles, such as bottle preforms. A melt-phase process to produce polymer particles can employ a combination of acetaldehyde stripping and acetaldehyde scavengers added near the very end or exit of the melt-phase process. The particles exiting the stripping zone can be blended with concentrate particles at temperatures which maintain both types of particles in the solid form.

Examples of effective acetaldehyde scavengers are any of those known in the art, and in particular, amino-terminated polyamides having a molecular weight of less than 25,000 g/mol, or less than 20,000 g/mol, or less than 12,000 g/mol, and preferably the reaction products of adipic acid with m-xylylene diamine. The end groups of these polyamides form 'imines' with AA and virtually bind it into the polyamide chain ends. The amino-terminated polyamide acetaldehyde scavengers disclosed in U.S. Pat. Nos. 6,444,283 B1, 6,239,233, 5,340,884, 5,266,413, and 5,258,233, are incorporated herein by reference in their entirety. Alternatively, anthranilamide derivatives may be used, such as those disclosed under U.S. Pat. Nos. 6,762,275 and 6,274,212 B1, incorporated herein by reference in their entirety.

Once the polyester polymer spheroids are made with the stated properties, they may be fed to an extruder suitable to make containers or sheet after being dried to remove moisture from the spheroids. Accordingly, there is also provided a method of melt processing polyester polymer spheroids comprising:

A) drying polyester polymer spheroids in a drying zone to produce dried spheroids;
B) introducing the dried spheroids into an melting zone;
C) melting the polyester polymer spheroids in the melt processing zone, and
D) forming an article from the molten polymer;

wherein the polyester polymer spheroids introduced into the drying zone have the characteristics described above.

The drying zone comprises a dryer. Dryers feeding a melt processing zone reduce the moisture content of spheroids. Moisture in or on spheroids fed into a melt extrusion chamber will cause the melt to lose excessive It.V. at melt temperatures by hydrolyzing the ester linkages with a resulting negative impact on the melt flow characteristics of the polymer and stretch ratio of the preforms when blown into bottles. Therefore, prior to extrusion the spheroids are dried with a flow of hot dry gas at a temperature of 140° C. or more to drive off most of the moisture on and in the particle. It is desirable to dry the spheroids at high temperatures of 140° C. or more to decrease the residence time of the spheroids in the dryer and increase throughput. In general, the typical residence time of spheroids in the dryer at conventional temperatures (140° C. to 190° C.) will be on average from 0.75 hours to 12 hours.

Any conventional dryer can be used. The spheroids may be contacted with a flow of heated air or inert gas such as nitrogen to raise the temperature of the spheroids and remove volatiles from inside the spheroids, and may also be agitated by a rotary mixing blade or paddle. The flow rate of the heating gas, if used, is a balance between energy consumption, residence time of spheroids, and preferably avoiding the fluidization of the spheroids. Suitable gas flow rates range from 0.05 to 100 SCFM for every pound per hour of spheroids discharged from the dryer, preferably from 0.2 to 5 SCFM per lb/hr of spheroids.

The spheroids of the invention exhibit a lower tendency to agglomerate in the dryer at drying temperatures than conventional geometric shaped particles which have not been polymerized in the solid state or having similar characteristics.

Once the spheroids have been dried, they are introduced into a melt processing zone to form molten polyester polymer, followed by forming an article such as a sheet or a molded part. Any conventional technique used to melt spheroids and form articles therefrom can be used. Suitable melt processing zones include extruders equipped with a barrel, one or more screws in the barrel, a motor to turn the screw, heating elements to direct heat through the barrel to the spheroids, and a die plate through which the molten polymer is forced. The die may be a sheet die, optionally connected to a thermoforming mold. Another melt processing zone is an injection molding machine equipped with the same features, except that a nozzle is used instead of a die through which the polymer is forced into a runner system that directs the polymer into one or more mold cavities. An example of a molded part includes a bottle preform (parison).

In the melt processing zone to produce an article, or in the melt-phase process for making the polyester polymer, other components can be added to the composition of the present invention to enhance the performance properties of the polyester polymer. These components may be added neat to the bulk polyester, may added as a dispersion in a liquid carrier or may be added to the bulk polyester as a polyester concentrate containing at least about 0.5 wt. % of the component in the polyester let down into the bulk polyester. The types of suitable components include crystallization aids, impact modifiers, surface lubricants, stabilizers, denesting agents, antioxidants, ultraviolet light absorbing agents, metal deactivators, colorants, nucleating agents, acetaldehyde lowering compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

In each of these embodiments, the articles of manufacture are not limited, and include sheet and bottle preforms. The bottle preforms can be stretch blow molded into bottles by conventional processes. Thus, there is also provided in an embodiment the bottles made from the spheroids of the invention, or made by any of the processes of the invention, or made by any conventional melt processing technique using the spheroids of the invention.

Not only may containers be made from spheroids made according to the process of this invention, but other items such as sheet, film, bottles, trays, other packaging, rods, tubes, lids, filaments and fibers, and other molded articles may also be manufactured using the polyester spheroids of the invention. Made from polyethylene terephthalate, beverage bottles suitable for holding water or carbonated beverages, and heat set beverage bottles suitable for holding beverages which are hot filled into the bottle are examples of the types of bottles which are made from the crystallized spheroids of the invention.

The invention may now be further understood by reference to the following non-limiting illustrative examples.

EXAMPLES

The materials described here were used in all subsequent examples.

Voridian PET CB12 polyester polymer is commercially available from Eastman Chemical Company. CB12 pellets are approximately cylindrical in shape and are produced from cutting a strand of polymer. CB12 pellets are semi-crystalline and solid-stated.

UWC and UW AC pellets were produced on an underwater pelletization apparatus using Voridian PET CB12 polyester polymer as a feed. Although the It.V. of these pellets was not measured, CB12 polyester processed in this manner typically has an It.V. of 0.78 to 0.82 dL/g. These pellets are spheroidal by the definition previously set forth.

UWC pellets were made by cutting resin underwater at a water temperature of about 160° C., thus yielding semi-crystalline pellets. The residence time of the pellets in the pressurized hot water crystallizer was about 5 minutes.

UW AC pellets were made by cutting resin underwater at a water temperature of about 90° C., so the pellets were amorphous. They were subsequently crystallized in the small batch paddle crystallizer. Room temperature pellets were charged into the crystallizer preheated to a set point of 210° C. Average pellet temperature (measured using an IR pyrometer "gun") was about 157° C. after 30 minutes and about 162° C. after 35 minutes. The pellets were then discharged into buckets and allowed to cool naturally.

16-3001 polymer is modified with 3.0 mole % isophthalic acid and about 3.6 mole % diethylene glycol. It was polymerized to a final It.V. of about 0.82 in the melt phase and underwent standard cut-strand pelletization to produce typical approximately cylindrical pellets. The pellets were crystallized in a continuous process by passing it through two horizontal jacketed elongated vessels which were agitated by a longitudinal shaft with radially-mounted paddles. The heating medium circulated through the jacket was set at 180° C., which yielded a temperature for the pellets exiting the vessel of about 165° C. Residence time of the polymer in the vessels was about 30 minutes.

12-3001 polymer is modified with 3.0 mole % isophthalic acid and about 3.6 mole % diethylene glycol. It was polymerized to a final It.V. of about 0.82 in the melt phase and underwent standard cut-strand pelletization to produce typical approximately cylindrical pellets. The pellets were crystallized in a batch rotary double-coned dryer by heating the polymer up to 180° C., then cooling back to ambient.

Table 1 summarizes key information about the spherical and cylindrical pellets used for this work.

RPU pellets were made on a Roll Processing Unit using Voridian PET CB12 polyester polymer as a feed. RPU pellets are "slabical" in shape, and all of the pellets used for this work had nominal lateral dimensions of 3×3 mm and thickness of 2.25 to 2.5 mm (0.090 to 0.100 inch). The RPU pellets were made at a rate of about 325 lb/hr with the calendar roll temperature set-point of about 150° C.

Table 2 summarizes key information about the RPU pellets used for this work. Sheet temperature was measured using an IR pyrometer "gun" and is therefore the temperature of the sheet surface. The It.V. of the RPU 150 and RPU 179 pellets was not measured, but (based on many measurements of other pellets made using similar drying and extrusion conditions) is expected to be in the 0.79 to 0.81 range. Crystallinity was determined, in duplicate, from first-heat DSC run at 20°

C./min by summing the heat of fusion (in J/g) of all melting peaks, subtracting the heat of any crystallization peaks, and dividing by 119 (the heat of fusion, in J/g, of 100% crystalline PET).

TABLE 1

Characteristics of the Cylindrical and Spherical Pellets

| Pellet ID | Unit | Crystallization Temp (°C.) | Crystallization Time (min) | Pellet Geometry | It.V. (dL/g) | Crystallinity (wt % by DSC) |
|---|---|---|---|---|---|---|
| CB12 | Commercial Crystallizer and Solid Stater | ~210 | ~500 | Cut Strand Cylindrical | 0.84 | 48% |
| UWC | Continuous Underwater Pelletization and Underwater Crystallization | ~160 | ~5 | UW Spheroid | N/A | 41% |
| UW AC | Batch Air Crystallized By Contacting Amorphous Particles with Surface of Hot Jacket | 157-162 | ~5 + 30 min ramp up | UW Spheroid | N/A | 37% |
| 16-3001 | Continuous Air Crystallized By Contacting Amorphous Particles With Surface Of A Hot Jacket | ~165 | ~30-60 | Cut Strand Cylindrical | 0.82 | 35% |
| 12-3001 | Batch Air Crystallized By Contacting Amorphous Particles with Surface of Hot Jacket | ~180 | ~120-180 | Cut Strand Cylindrical | 0.82 | 37% |

TABLE 2

Characteristics of the RPU Pellets

| Pellet ID | Calendar Roll T (°C.) | Sheet Temperature (°C.) Roll Entrance | Sheet Temperature (°C.) Roll Exit | It. V. (dL/g) | Crystallinity (wt % by DSC) |
|---|---|---|---|---|---|
| RPU 150 | 142 | 120 | 150 | N/A | 41% |
| RPU 166 | 145 | 134 | 166 | 0.76 | 42% |
| RPU 179 | 155 | 147 | 179 | N/A | 38% |

Example 1

The pellets were heated in a hopper of a dryer. The dryer consisted of a bank of five hoppers serviced by a single Conair drying unit by means of an insulated manifold system. Typically, the pellets to be investigated were placed in Hopper 1 (first hopper on the supply manifold), dummy pellets were placed in Hopper 3, and the air supply valves to Hoppers 2, 4, and 5 were closed. This procedure was followed to prevent excessively high air flow through Hopper 1.

FIG. 1 illustrates the geometry and dimensions in inches of the dryer hopper used in the experiments.

The base of the hopper is sealed by simple sliding gate valve. The slide may be completely removed to fully open the hopper exit. The dryer was thoroughly preheated to its operating temperature prior to charging the hopper with pellets. Hopper 3 was charged with about 20 pounds (roughly 80% of the hopper capacity) of dummy pellets (typically CB12) and a similar quantity of test pellets were loaded into Hopper 1. A sheathed thermocouple was inserted into the bed of test pellets with its tip several inches below the bed surface and the temperature was periodically recorded.

The residence time of the pellets in Hopper 1 was a uniform 3.0 hours. The slide was removed from the gate valve and, if the pellets did not freely flow from the hopper exit, the base of the hopper at the gate valve was struck sharply by hand with the edge of the slide. This "whacking" was repeated at a deliberate pace until pellet flow commenced, up to a maximum of 20 whacks. If the pellet bed remained stuck after this, a rod was inserted into the open gate valve up through the pellet bed. A single jab of the rod was always sufficient to cause rapid pellet flow and complete emptying of the hopper; multiple strokes or "chipping" were never required. This was also the case when pellet flow was induced by whacking; once pellet flow was initiated the entire bed of pellets freely and rapidly flowed from the hopper. In all cases, regardless of the degree of sticking in the hopper, once the pellets flowed from the hopper there was no residual adhesion between pellets—no clumps of pellets, no "doubles" or "triples", only a bucketful of individual pellets.

Representative first-heat DSC scans of the pellets were performed and analyzed. For the most part, there was no obvious relationship between the temperature at which DSC transitions occurred and pellet sticking behavior.

The DSC results for the all of RPU pellets fed to the dryer were very similar with the only feature being a single melting peak departing the baseline at 195-200° C. and peaking at 250-252° C. The DSC results for the 16-3001 pellets and the UWC AC and UWC pellets showed an obvious feature of a the low melting temperature endotherm departing from the baseline at about 160° C. and centered at 181° C. The low melting temperature endotherm peaked at 174° C., indicating a pellet crystallization temperature of 155-160° C. The peak departed from the baseline at 135-140° C., but minor changes in the assumed slope of the baseline increase this temperature by 20-25° C.

The final temperature achieved by the pellets in the hopper was 190° C. At 30 minutes the temperature was 180° C.; at 45 minutes, 187° C.; at 60 minutes, 188° C.; and at 90 minutes and beyond, 190° C. The pellet temperature closely approached equilibrium after about 45 minutes, and truly achieved its ultimate value after about 90 minutes.

The results of the pellet sticking experiment are set forth in Table 3. As described in detail above, pellets were heated in Hopper 1 for 3 hours to the indicated temperature, the gate valve slide was removed, and the gate valve at the base of the hopper was struck sharply with the slide at a deliberate pace until pellet flow commenced. If pellet flow had not started after 20 such whacks with the slide, the experiment was terminated and the test condition was scored ">20 whacks".

As a reference, normal solid stated CB12 subjected to the sticking protocol was found to flow freely (zero whacks required to start flow) at about 185° C., the highest temperature achievable in the dryer equipment.

TABLE 3

Whacks Required to Start Pellet Flow at Several Temperatures

| Pellet Type | Whacks Required to Start Pellet Flow | | |
|---|---|---|---|
| | @175° C. | @181-182° C. | @184-186° C. |
| RPU 150 | Insufficient Data | >20 | Assumed >20[1] |
| RPU 166 | 5 | 7 | >20 |
| RPU 179 | 5 | >20 | Assumed >20[1] |
| 16-3001 | ≧5 | >20 | Assumed >20[1] |
| UW AC | 0 | 3 | 3 |
| UWC | 0 | 1 | 1 |

Note
[1]Not measured, but concluded to be based on assumption that sticking does not decrease with increasing temperature It is clear that the spheroidal pellets—both the UW AC and the UWC pellets—are far less sticky at elevated temperature than either the slabical RPU pellets or the cylindrical 16-3001 pellets. At about 175° C. spheroidal pellets crystallized both in air and in water were free flowing, while all of the other types of pellets required at least 5 whacks to induce flow (there is not enough data to say this with certainty for the RPU 150 pellets, but based on the data that does exist it seems a near-certain assumption). The differences in sticking are even more striking at 181-182° C., where both types of spherical pellets required only a single whack to start flow (measured for UWC, interpolated between two points for UW AC), the RPU 166 pellets required 7 whacks, and all the other types of pellets required >20 whacks. At 186° C., the UWC pellets still flowed freely after a single whack and the UW AC pellets flowed freely after 3 whacks, whereas the cylindrical and slabical pellets all remained stuck after 20 whacks.

The 16-3001 pellets were crystallized at a temperature and in a manner very similar to the UW AC pellets, and both types of pellets have very similar composition and IV.

Example 2

In this series of experiments, the angle of repose PET pellets of various shapes and morphologies was analyzed. The angle of repose is a measure of the frictional properties of a granular material and may be related to the propensity of pellets to stick in a dryer. A higher angle of repose means that the pellets are more likely to stick in a dryer, whereas a lower angle of repose indicates a material is more free-flowing.

FIGS. 2 and 3 show fixtures for the testing of angle of repose of granular materials. The test fixtures were designed to function inside a large dryer at elevated temperatures. The dryer is equipped with a baffle to direct air flow through the test fixtures and heat the pellets effectively.

The gate test (FIG. 2) is a box comprising a wire mesh base 1, two fixed side walls 3, a fixed back wall 5, and a vertically removable side, or gate 7. The inside dimensions of the gate test box are 5.75×5.75×8.00 inches. At the start of the test, the gate 7 is held in place with a latch to allow the box to be filled with pellets 9. The dryer is turned on at time zero. After the appropriate elapsed time, the dryer is opened and the pellet temperature is measured with a Raytek Raynger MX IR pyrometer (model# RAYMX4PCFU). The gate 7 is then slowly lowered vertically until the top edge of the gate 7 is lower than the base 1 and the gate 7 is able to be removed. As the gate 7 is lowered, some pellets 9 flow out if the box. After the flow of pellets 9 ceases, the pellet bed height H on the back wall 5 is measured. The angle of repose φ may be calculated by: tan φ=H/D; where D is the depth of the bed and is equivalent to the horizontal dimension of the box side wall 1.

The heap test (FIG. 3) is a stationary platform inside a moveable box. The box has four welded sides 21 and a wire mesh bottom. The inside dimensions of the heap test box are 5.75×5.75×3.00 inches. The box was then mounted onto a jack stand 23 with holes drilled in it to allow air flow through the pellets 25. The jack stand comprised legs 31, a jacking screw 33, and a height adjustment knob 35. A horizontal disc 22 of radius R=1.5 inches was attached to a stationary rod 37. The rod 37 passed through holes in the bottom of the box and the jack stand 23. At the start of the test, the box was raised so that the disc 22 was in contact with the bottom of the box. The box was then filled with pellets 25. The dryer is turned on at time zero. After the appropriate elapsed time, the dryer is opened and the pellet temperature is measured with a Raytek Raynger MX IR pyrometer (model#RAYMX4PCFU). The box is then slowly lowered by turning the knob 35 until the tops of box walls 21 are below the disc 22. The height H of the pile of pellets 25 remaining on the disc 22 is measured and the angle of repose may be calculated by: tan φ=H/R.

Since the angle of repose is temperature dependent, these measurements are performed while remaining heated inside the dryer. If the pellets are allowed to cool, the piles of pellets in the test fixtures will slump, resulting in an artificially low angle of repose measurement.

Drying times were between 3 and 8 hours and drying temperature setpoints were between 165 C and 185 C. These conditions were chosen to approximate dryer operation conditions commonly practiced commercially.

Results from both test methods are presented in Tables 4 and 5. There was substantial variation in the actual pellet temperature for a given dryer setpoint temperature. The variation was as large as 20 C, thus all results must be analysed in terms of actual temperatures. In most instances, for a given setpoint temperature, there was a drift to higher actual pellet temperatures as the elapsed time in the dryer increased. The pellet temperatures in the gate test method were consistently about 10° C. higher than achieved in the heap test method.

Overall, the data indicate that actual pellet temperature had a stronger effect on the angle of repose than the elapsed time in the dryer.

The gate test consistently produced higher measured angles of repose. While the temperature bias may explain part of the difference, a temperature range of 20 C experienced within each test method according to the experimental design produced less variation than observed between test methods with a 10 C temperature bias. Thus, it is reasonable to conclude that the geometry of the test method has a significant influence on the results.

While temperature and time had some effect on the angle of repose, the effects of pellet geometry and morphology were more substantial. FIG. 4 shows a comparison of the angles of repose for the five materials studied by the gate test method. The five data points for each material represent all of the time/temperature combinations investigated. Over a range of drying times and temperatures, the spheroidal UWC material exhibited a much lower angle of repose than the other cylindrical or slabical materials. From this data, the pellet geometry appears to more important in providing a low angle of repose than the morphology of the material.

FIG. 5 shows a similar analysis for the heap test. The five data points for each material represent all of the time/temperature combinations investigated. In this instance, the spheroidal UWC pellets have a significantly lower angle of repose than any of the other cylindrical or slabical materials. From this data, the pellet geometry appears to more important in providing a low angle of repose than the morphology of the material.

Considering both angle of repose tests, the spheroidal UWC pellets consistently provide the lowest angle of repose. Given the differences in the results between the gate and the heap tests, it is difficult to detect a meaningful trend in the data as a function of annealing time for the same pellet geometry and very similar compositions (16-3001, 12-3001, and CB12). At the start of the experiment, a hypothesis was that annealing during crystallization and/or solid-stating reduces the amount of amorphous material that may participate in inter-pellet interactions at drying temperatures and thus annealing would lead to decreased angles of repose. While there is some indication of this with the gate test data set, the geometrical effect is much stronger.

Modeling of the angle of repose data from elevated temperature experiments failed to yield significant effects apart from the distinction between materials. When room temperature angle of repose data were included in the modeling, significant temperature and material effects were detected at 95% confidence while drying time was not a significant parameter.

The following conclusions may be drawn from this example:
a) UWC spherical pellets had a distinctly lower angle of repose than the other pellets investigated. Pellet geometry is presumed to be the major factor responsible for this result.
b) Drying time did not appear to have a significant effect on the angle of repose, except perhaps at the highest temperatures and longest times studied.
c) Over the temperature range common for dryer operation, the angle of repose showed a very weak dependence on temperature and a much more significant dependence on pellet shape.

Thus, in one embodiment, there is provided spheroid pellets having an angle of repose of less than 34.0°, or less than 32.0°, or 31.0° or less, or 30.0° or less, in a gate test at an actual pellet temperature of 165° C. after 5 hours.

TABLE 4

Gate Test Results

| Material | Set Temp (° C.) | Actual Pellet Temp (° C.) | Elapsed Time (hrs) | Height, H (in) | Base, L (in) | Angle φ (°) |
|---|---|---|---|---|---|---|
| 12-3001 | 165 | 154.8 | 3 | 4.375 | 5.750 | 37.3 |
| 12-3001 | 165 | 156.2 | 8 | 4.562 | 5.750 | 38.4 |
| 12-3001 | 175 | 165.9 | 5 | 4.625 | 5.750 | 38.8 |
| 12-3001 | 185 | 173.0 | 3 | 4.312 | 5.750 | 36.9 |
| 12-3001 | 185 | 175.7 | 8 | 6.000 | 5.750 | 46.2 |
| 16-3001 | 165 | 154.7 | 3 | 4.750 | 5.750 | 39.6 |
| 16-3001 | 165 | 158.0 | 8 | 5.812 | 5.750 | 45.3 |
| 16-3001 | 175 | 162.7 | 5 | 5.437 | 5.750 | 43.4 |
| 16-3001 | 185 | 176.3 | 3 | 5.469 | 5.750 | 43.6 |
| 16-3001 | 185 | 165.3 | 8 | 5.437 | 5.750 | 43.4 |
| CB12 | 165 | 151.6 | 3 | 4.375 | 5.750 | 37.3 |
| CB12 | 165 | 154.3 | 8 | 4.375 | 5.750 | 37.3 |
| CB12 | 175 | 165.2 | 5 | 4.219 | 5.750 | 36.3 |
| CB12 | 185 | 162.6 | 3 | 4.469 | 5.750 | 37.9 |
| CB12 | 185 | 171.4 | 8 | 4.500 | 5.750 | 38.0 |
| RPU 179 | 165 | 155.3 | 3 | 4.625 | 5.750 | 38.8 |
| RPU 179 | 165 | 156.8 | 8 | 4.906 | 5.750 | 40.5 |
| RPU 179 | 175 | 164.9 | 5 | 5.000 | 5.750 | 41.0 |
| RPU 179 | 185 | 168.2 | 8 | over top | 5.750 | 77.2 |
| RPU 179 | 185 | 174.2 | 3 | 5.312 | 5.750 | 42.7 |
| UWC | 165 | 156.0 | 3 | 3.187 | 5.750 | 29.0 |
| UWC | 165 | 156.6 | 8 | 3.250 | 5.750 | 29.5 |
| UWC | 175 | 164.6 | 5 | 3.250 | 5.750 | 29.5 |
| UWC | 185 | 171.7 | 3 | 3.312 | 5.750 | 29.9 |
| UWC | 185 | 178.6 | 8 | 4.687 | 5.750 | 39.2 |
| 16-3001* | 21 | 21 | 0 | 4.333 | 5.750 | 37.0 |
| CB12* | 21 | 21 | 0 | 3.865 | 5.750 | 33.9 |
| RPU 179* | 21 | 21 | 0 | 3.750 | 5.750 | 33.1 |
| UWC* | 21 | 21 | 0 | 2.927 | 5.750 | 27.0 |

*denotes average of three measurements

TABLE 5

Heap Test Results

| Material | Set Temp (° C.) | Actual Pellet Temp (° C.) | Elapsed Time (hrs) | Height, H (in) | Disc Radius, R (in) | Angle φ (°) |
|---|---|---|---|---|---|---|
| 12-3001 | 165 | 142.9 | 3 | 1.187 | 1.500 | 38.4 |
| 12-3001 | 165 | 146.7 | 8 | 0.875 | 1.500 | 30.3 |
| 12-3001 | 175 | 153.7 | 5 | 0.969 | 1.500 | 32.9 |
| 12-3001 | 185 | 161.5 | 3 | 0.906 | 1.500 | 31.1 |
| 12-3001 | 185 | 164.2 | 8 | 0.937 | 1.500 | 32.0 |
| 16-3001 | 165 | 141.0 | 3 | 0.937 | 1.500 | 32.0 |
| 16-3001 | 165 | 151.2 | 8 | 1.125 | 1.500 | 36.9 |
| 16-3001 | 175 | 156.6 | 5 | 1.062 | 1.500 | 35.3 |
| 16-3001 | 185 | 160.2 | 3 | 1.062 | 1.500 | 35.3 |
| 16-3001 | 185 | 155.6 | 8 | 1.031 | 1.500 | 34.5 |
| CB12 | 165 | 135.0 | 3 | 1.125 | 1.500 | 36.9 |
| CB12 | 165 | 149.3 | 8 | 1.062 | 1.500 | 35.3 |
| CB12 | 175 | 156.1 | 5 | 1.062 | 1.500 | 35.3 |
| CB12 | 185 | 158.2 | 3 | 1.062 | 1.500 | 35.3 |
| CB12 | 185 | 167.0 | 8 | 1.094 | 1.500 | 36.1 |
| RPU 179 | 165 | 144.8 | 3 | 1.187 | 1.500 | 38.4 |
| RPU 179 | 165 | 151.6 | 8 | 1.125 | 1.500 | 36.9 |
| RPU 179 | 175 | 150.3 | 5 | 1.250 | 1.500 | 39.8 |
| RPU 179 | 185 | 159.0 | 8 | 1.187 | 1.500 | 38.4 |
| RPU 179 | 185 | 158.4 | 3 | 1.094 | 1.500 | 36.1 |
| UWC | 165 | 145.1 | 3 | 0.687 | 1.500 | 24.6 |
| UWC | 165 | 145.6 | 8 | 0.625 | 1.500 | 22.6 |
| UWC | 175 | 158.8 | 5 | 0.625 | 1.500 | 22.6 |
| UWC | 185 | 160.3 | 3 | 0.719 | 1.500 | 25.6 |
| UWC | 185 | 171.6 | 8 | 0.750 | 1.500 | 26.6 |
| 16-3001* | 21 | 21 | 0 | 0.948 | 1.500 | 32.3 |
| CB12* | 21 | 21 | 0 | 0.885 | 1.500 | 30.6 |

TABLE 5-continued

Heap Test Results

| Material | Set Temp (° C.) | Actual Pellet Temp (° C.) | Elapsed Time (hrs) | Height, H (in) | Disc Radius, R (in) | Angle φ (°) |
|---|---|---|---|---|---|---|
| RPU 179* | 21 | 21 | 0 | 0.865 | 1.500 | 30.0 |
| UWC* | 21 | 21 | 0 | 0.666 | 1.500 | 24.0 |

*denotes average of three measurements

We claim:

1. A method for melt processing polyester polymer spheroids comprising:
   (A) introducing polyester polymer spheroids into a drying zone comprising a dryer, said polyester polymer spheroids having been gas stripped to 10 ppm or less of residual acetaldehyde, and having been manufactured in a melt phase polycondensation reaction to an intrinsic viscosity (It.V.) of at least 0.72 dL/g, said dryer feeding a melt processing zone, and drying the polyester polymer spheroids in the drying zone to produce dried spheroids,
   (B) introducing the dried spheroids in the melt processing zone,
   (C) melting the dried spheroids in the melt processing zone to produce a molten polymer, and
   (D) forming an article from the molten polymer.

2. The method of claim 1, wherein the polyester polymer spheroids have a degree of crystallinity ranging from 25% to 45%.

3. The method of claim 1, wherein the polyester polymer spheroids have one or more melting point characterized by:
   (A) at least two melting peaks, wherein one of said at least two melting peaks when measured on a Differential Scanning calorimeter (DSC) first heating scan is a low peak melting point having a peak temperature ranging from 140° C. to 220° C. and having a melting endotherm area of at least the absolute value of 1 J/g, or
   (B) one or more melting points that, when measured on a Differential Scanning calorimeter (DSC) first heating scan, has a heating curve departing from a baseline in the endothermic direction at a temperature of 200° C. or less.

4. The method of claim 1, wherein the polyester polymer spheroids introduced into the drying zone have:
   (A) an average intrinsic viscosity (It.V.) of at least 0.72 dL/g, and either
   (B) melting points characterized by:
      (i) at least two melting peaks, wherein one of said at least two melting peaks when measured on a Differential Scanning calorimeter (DSC} first heating scan is a low peak melting point having a peak temperature ranging from 140° C. to 220° C. and having a melting endotherm area of at least the absolute value of 1 J/g, or
      (ii) one or more melting points that, when measured on a Differential Scanning calorimeter (DSC} first heating scan, has a heating curve departing from a baseline in the endothermic direction at a temperature of 200° C. or less, or
   (C) a degree of crystallinity ranging from 20% to $T_{cmax}$ wherein $T_{cmax}$ is defined by the following equation:

$$T_{cmax} = 50\% - CA - OH$$

wherein CA is the total mole % of all carboxylic acid residues other than terephthalic acid residues, based on 100 mole % of carboxylic acid residues in the polyester polymer, and OH is the total mole % of hydroxyl functional compound residues other than ethylene glycol residues, based on 100 mole % of the hydroxyl functional compounds residues; and
   (D) a residual acetaldehyde level of 10 ppm or less.

5. The method of claim 1, wherein the polyester polymer spheroids introduced into the drying zone comprise at least 75% virgin polyester polymer.

6. The method of claim 1, wherein the angle of repose is 32° or less.

7. The method of claim 1, wherein the polyester polymer spheroids introduced into the drying zone have a roundness distribution, and the mode of the roundness distribution is 1.4 or less.

8. The method of claim 7, wherein the mode of roundness distribution is 1.2 or less.

9. The method of claim 1, wherein the polyester polymer spheroids introduced into the drying zone comprise:
   (A) a carboxylic acid component comprising at least 80 mole % of the residues of terephthalic acid or derivatives of terephthalic acid, or mixtures thereof, and
   (B) a hydroxyl component comprising at least 80 mole % of the residues of ethylene glycol, based on 100 mole percent of carboxylic acid component residues and 100 mole percent of hydroxyl component residues in the polyester polymer.

10. The method of claim 1, wherein the polyester polymer spheroids introduced into the drying zone comprise:
    (A) a carboxylic acid component comprising at least 90 mole % of the residues of terephthalic acid and/or derivatives of terephthalic acid, and
    (B) a hydroxyl component comprising at least 90 mole % of the residues of ethylene glycol, based on 100 mole percent of the carboxylic acid component residues and 100 mole percent of the hydroxyl component residues in the polyester polymer.

11. The method of claim 1, wherein the polyester polymer spheroids introduced into the drying zone have a low peak melting point within a range of 160° C. to 210° C., a degree of crystallinity ranging from 25% to 45%, the number average weight of the polyester polymer spheroids ranging from 1.0 gram per 100 particles to 100 grams per 100 particles, and the residual acetaldehyde content is 7 ppm or less.

12. The method of claim 1, wherein the polyester polymer spheroids introduced into the drying zone have an intrinsic viscosity (It.V.) ranging from 0.78 dL/g to 1.1 dL/g.

13. The method of claim 1, wherein the polyester polymer spheroids introduced into the drying zone are obtained by underwater cutting the polyester polymer.

14. The method of claim 1, wherein the polyester polymer spheroids have a degree of crystallinity obtained by thermal crystallization of the spheroids in a liquid medium comprising water at a temperature above the glass transition temperature ($T_g$) of the polyester polymer.

15. A preform obtained by the method of claim 1.

16. A stretch blow molded bottle obtained by the method of claim 1.

17. A perform obtained by the method of claim 4.

18. A stretch blow molded bottle obtained by the method of claim 4.

19. The method of claim 1, wherein the article is a sheet.

20. The method of claim 4, wherein the article is a sheet.

21. The method of claim 1, wherein the polyester polymer spheroids introduced into the drying zone, when measured by a gate test at an actual pellet temperature of 165° C. after 5 hours, have an angle of repose of 34° or less.

22. The method of claim 21, wherein the angle of repose is 32° or less.

23. The method of claim 22, wherein the angle of repose is 30° or less.

24. The method of claim 23, wherein the polyester polymer spheroids have a roundness distribution, and the mode of the roundness distribution is 1.4 or less.

25. The method of claim 24, wherein the mode of the roundness distribution is 1.2 or less.

26. The method of claim 1, wherein the polyester polymer spheroids are spheroids of a polyester polymer in which at least 80 mol % of a carboxylic acid component are residues of at least one selected from the group consisting of terephthalic acid, naphthalene-2,6-dicarboxylic acid and mixtures thereof.

* * * * *